(12) United States Patent
Nielsen

(10) Patent No.: US 10,517,218 B2
(45) Date of Patent: *Dec. 31, 2019

(54) FREQUENCY-FREQUENCY GRAPHICAL USER INTERFACE FOR INDEPENDENT FREQUENCY CONTROL OF THE SHAKER HEAD OF A HARVESTER

(71) Applicant: Nexgen Ag, LLC, Chico, CA (US)

(72) Inventor: Gavin Nielsen, Chico, CA (US)

(73) Assignee: Nexgen Ag, LLC, Chico, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 15/610,100

(22) Filed: May 31, 2017

(65) Prior Publication Data
US 2017/0344238 A1    Nov. 30, 2017

Related U.S. Application Data

(60) Provisional application No. 62/343,723, filed on May 31, 2016, provisional application No. 62/343,727, (Continued)

(51) Int. Cl.
*A01D 46/26* (2006.01)
*A01D 75/00* (2006.01)
(Continued)

(52) U.S. Cl.
CPC .............. *A01D 46/26* (2013.01); *A01D 75/00* (2013.01); *G06F 3/04847* (2013.01);
(Continued)

(58) Field of Classification Search
CPC .. A01D 46/26; A01D 75/00; A01D 2046/266; G06F 9/453; G06F 3/04847;
(Continued)

(56) References Cited

U.S. PATENT DOCUMENTS 3,796,031 A * 3/1974 Fridley .................. A01D 46/26
                                                     56/340.1
3,812,662 A * 5/1974 Savage .................. A01D 46/26
                                                     56/340.1
(Continued)

OTHER PUBLICATIONS

Marshall W. Johnson, Cooperative Extension Specialist & Entomologist, Department of Entomology, University of California, Riverside, CA 92521, "California Olive Committee, Annual Research Report 2008," (Jan. 20, 2009), 97 pages.
(Continued)

*Primary Examiner* — Gertrude Arthur Jeanglaude
(74) *Attorney, Agent, or Firm* — Dergosits & Noah LLP

(57) ABSTRACT

A graphical user interface is disclosed for controlling a harvesting system, the harvesting system driving each of two shaking actuator frequencies individually, the user interface setting or displaying the frequencies of the two actuators as a single point on a display—a Frequency-Frequency User Interface (FFUI). The FFUI abstracts the tuning process of shaking with independent frequency control, allowing a user to choose the parameters for shaking the tree, e.g., frequencies, duration at a given frequency, etc., all while observing the effects of the shake taking place on the tree. The FFUI employs user gestures to map the shaker eccentric speeds and directions to the x and y coordinates of a graph, with the length of time a user gesture remains at any given coordinate pair determining the time that the first and second eccentric frequencies are driven according to the values of the given coordinate pair.

20 Claims, 20 Drawing Sheets
(14 of 20 Drawing Sheet(s) Filed in Color)

Related U.S. Application Data filed on May 31, 2016, provisional application No. 62/343,716, filed on May 31, 2016, provisional application No. 62/343,732, filed on May 31, 2016.

(51) Int. Cl.
*G06F 3/0484* (2013.01)
*G06F 3/0488* (2013.01)
*G06F 9/451* (2018.01)

(52) U.S. Cl.
CPC .......... *G06F 3/04886* (2013.01); *G06F 9/453* (2018.02); *A01D 2046/266* (2013.01); *G06F 9/451* (2018.02); *G06F 2203/04808* (2013.01)

(58) Field of Classification Search
CPC ................. G06F 3/04886; G06F 9/451; G06F 2203/04808
USPC .......................................................... 701/50
See application file for complete search history.

(56) References Cited

U.S. PATENT DOCUMENTS

| | | |
|---|---|---|
| 4,286,426 A | 9/1981 | Orlando et al. |
| 4,982,558 A | 1/1991 | Korthuis |
| 5,259,177 A | 11/1993 | Windemuller et al. |
| 5,473,875 A | 12/1995 | Zehavi et al. |
| 6,405,516 B1 | 6/2002 | Orlando |
| 7,918,078 B2 | 4/2011 | Poggiagliolmi |
| 8,511,051 B2 | 8/2013 | Pellenc |
| 8,650,847 B2 | 2/2014 | Snell |
| 9,060,465 B2 | 6/2015 | Vande Voort et al. |
| 9,468,146 B2 * | 10/2016 | De Kleine .......... A01D 46/264 |
| 9,992,933 B2 | 6/2018 | Payne |

OTHER PUBLICATIONS

Declaration of Gavin Nielsen Under 37 CFR 1.56, U.S. Appl. No. 15/610,356, filed May 3, 2017, signed Apr. 24, 2019, 50 pages.
Document A, referenced within the Declaration of Gavin Nielsen filed herewith.
Document B, referenced within the Declaration of Gavin Nielsen filed herewith.
Document C, referenced within the Declaration of Gavin Nielsen filed herewith.
Document D, referenced within the Declaration of Gavin Nielsen filed herewith.
Document E, referenced within the Declaration of Gavin Nielsen filed herewith.
Document F, referenced within the Declaration of Gavin Nielsen filed herewith.
Document G, referenced within the Declaration of Gavin Nielsen filed herewith.
Document H, referenced within the Declaration of Gavin Nielsen filed herewith.
Document I, referenced within the Declaration of Gavin Nielsen filed herewith.

* cited by examiner

FREQUENCY-FREQUENCY GRAPHICAL USER INTERFACE FOR INDEPENDENT FREQUENCY CONTROL OF THE SHAKER HEAD OF A HARVESTER

CROSS-REFERENCE TO RELATED CASES

This application claims priority to the following U.S. Provisional Patent Applications, which are each incorporated by reference in their entirety: U.S. Provisional Patent Application No. 62/343,723, entitled "A FREQUENCY-FREQUENCY GRAPHICAL USER INTERFACE FOR INDEPENDENT FREQUENCY CONTROL OF THE SHAKER HEAD OF A HARVESTER," filed May 31, 2016; U.S. Provisional Patent Application No. 62/343,727, entitled "A VALUE-TIME GRAPHICAL USER INTERFACE FOR INDEPENDENT FREQUENCY CONTROL OF THE SHAKER HEAD OF A HARVESTER," filed May 31, 2016; U.S. Provisional Patent Application No. 62/343,716, entitled "INDEPENDENT FREQUENCY CONTROL OF THE SHAKER HEAD OF A HARVESTER," filed May 31, 2016; and U.S. Provisional Patent Application No. 62/343,732, entitled "COOLING SYSTEM FOR A SHAKER HEAD OF A HARVESTER," filed May 31, 2016.

TECHNICAL FIELD

The present invention relates to the field of agricultural technology, including, more particularly, to methods and systems for harvesting tree crops.

BACKGROUND

Agricultural harvesting for many different tree crops is accomplished through inertial trunk shaking. Exemplary crops include almonds, pistachios, prunes, olives and walnuts, to name a few. With inertial trunk shaking, a portion of the machine, called the "shaker head" is clamped onto the trunk or a major scaffold of the tree. Then eccentric weights are made to spin and generate inertial forces that transfer vibration into the tree. The vibration travels up the tree and through the branches, ultimately causing the product to detach and fall either to the ground or to a catching frame. For many crops and in many places this practice has replaced hand-harvesting methods, which are costly and challenging for growers. The practice also helps optimize the use of land area. Realizing these benefits makes growers more competitive in the global market.

One challenge that faces operators of this equipment is the appropriate tuning of this system to best remove product while minimizing damage to the tree; a challenging balance because these are diametrically opposed optimization targets. Currently, this challenge is addressed primarily "in the lab" (or probably in a workshop), through trial and error, where a reasonable baseline speed, or frequency, is established through various gearing techniques. Since one wants to optimize the frequency to be close the right natural frequencies of the tree, lab optimization begins to improve the frequency issue, but for simplicity of design, existing machines typically work with two eccentrics that are in a fixed ratio relationship to that baseline frequency. This ratio is typically a function of non-adjustable gearing, which means that even with the small changes to the baseline frequency that a change to the engine throttle might produce, the ratio of the speeds stays fixed. This leads to the second challenge: optimization of output geometry.

The geometric position output of a shaker head (in the horizontal plane) that has a single, spinning eccentric is a simple ellipse. When two eccentrics are spinning at different frequencies, this ellipse changes to be a trochoid. In general, the equation that governs the output position of the head (working from a simplified, free-body-diagram point of view), is shown below:

$$x(t) = E_1 \cos(F_1 * t) + E_2 \cos(F_2 * t) \quad \text{(Eq. 1)}$$

$$y(t) = E_1 \sin(F_1 * t) + E_2 \sin(F_2 * t) \quad \text{(Eq. 2)}$$

$$F_b = F_1 - F_2$$

$$E_r = E_1 / E_2$$

$$F_r = F_1 / F_2$$

Where
x(t) is the horizontal position of the head (in the horizontal plane) as a function of time
y(t) is the vertical position of the head (in the horizontal plane) as a function of time
$E_1$ is the eccentricity of the first eccentric (with dimension mass*length)
$E_2$ is the eccentricity of the second eccentric (with dimension mass*length)
$F_1$ is the frequency of the first eccentric (with dimension $\text{time}^{-1}$)
$F_2$ is the frequency of the second eccentric (with dimension $\text{time}^{-1}$)
t is time
$F_b$ is the beat frequency (difference in the constituent frequencies)
$E_r$ is the eccentricity ratio (dimensionless)
$F_r$ is the frequency ratio (dimensionless)

For linear actuators, E1 and E2 may be functions of time. This can be accomplished by varying the magnitude of the travel (peak-to-peak) of the moving mass. For a given frequency, as one increases the peak-to-peak magnitude of travel, the output will also increase. This also leads to nearly arbitrary output geometry and super-positioned frequencies, since there is no restriction that physics imposes any more to have a sinusoidal output per axes. X(t) and Y(t) become nearly arbitrary, though there are practical limitations for the length of travel of each actuator and for the mass/frequency combinations that result in force/power output limitations. For example, at any given time the actuator could deliver varying forces at a given frequency or vary frequencies at a given force. But, because of the inertial properties of the mass at the end of the linear actuator and the total travel capability of the actuator and the maximum speed of the actuator and the internal actuator force limitations, the actuator itself will be bounded only, it will have upper and lower bounds for those forces. In the same way, the output geometry size will have maximum bounds and the output frequencies will have minimums and maximums related to the same parameters.

The shape of the trochoid (not the absolute size) can be completely determined by the ratio of eccentricities and the ratio and sign of frequencies. Since a typical machine has fixed eccentrics and (as already described) fixed frequency ratios, the geometric position output of a typical head does not vary at all, regardless of the baseline frequencies and size of the eccentrics.

FIG. 1 depicts examples of trochoid shapes based on different frequency ratios. With $E_r$ fixed at the value of 1.6667 and $F_r$ varied, FIG. 1 depicts the resulting variety of trochoid shapes generated.

Each tree, as a complex mechanical structure, is unique in its vibratory transmission characteristics. Good cultural practices in pruning and consistency in treatment tend to yield statistically similar trees in a given block but this really depends on many other factors that are out of control of the grower, such as soil-type distribution throughout a given block. Additionally, hand-pruning is usually carried out by manual laborers, who vary significantly in their judgment calls as to what constitutes a wise choice for pruning cuts (and pruning cuts dictate much of the vibratory transmission characteristics). Soil moisture levels change constantly due to environmental factors such as weather and water availability, which changes the characteristics of the effective fulcrum formed by the ground and the trunk. Root structure varies significantly, which also changes how "soft" that ground-trunk fulcrum behaves. Furthermore, as a tree grows the mechanical properties of the wood change with age, as well as the size and geometry of the tree.

Year-to-year crop loads change dramatically, and different crop loads require different types of frequencies and geometries. In short, there is such vast variability from tree to tree that existing shakers often shake much harder than they need to, and shake at the wrong frequencies and wrong geometries—dumping unnecessary energy into the tree. This energy is lost in other forms (other than kinetic energy at the product), typically in short or long-term damage to the tree (e.g., root damage, trunk damage, scaffold/branch damage, defoliation, etc.). In addition, some of the crop is often left on the tree, which for the grower is literally unrealized profit.

Lastly, a tree's mechanical system changes as a shake is taking place because the crop is being removed, which changes the tree's mass distribution and the natural frequencies. The mechanical system also changes because the roots are moving in the ground, which changes how the soft fulcrum behaves. Different crops types and ages of trees evolve their dynamic state at different rates and have different safe envelopes.

It is not impossible to change the gearing of a typical shaker head: new sheaves, pumps, motors, etc., can be swapped in to create a new (albeit fixed) ratio. The problem with this is that it takes a large amount of time (often hours) to make this change just once. Such "tuning" of the shaker is very inefficient and time-expensive. In the middle of a harvest, time is money. Therefore, there is a disincentive to take the time (money) to try and make adjustments to a shaker head once a user feels that they are close enough.

For example, a typical tuning is usually performed "at the shop" and accomplished by changing the combination of gears, sprockets, pumps, motors, etc. Such tuning is not typically performed in the field. The small amount of tuning that is done in the field generally amounts to the following: tuning the eccentrics (typically two different eccentrics—e.g., changing their weights and manually setting a fixed speed ratio between the two), and either setting a fixed engine RPM level, or figuring out the sequence of how to move the throttle pedal to get the response wanted (very rough).

However, the typical tuning is unsatisfactory for a number of reasons. For example, tuning by way of engine throttle does not tune each eccentric individually, since they are each turning at a fixed ratio to the engine RPM. Tuning by way of varying the throttle via a pedal or lever, also does not allow a consistent, transient response—if the user is supposed to follow a shaking procedure by changing the engine throttle with their foot, it is very hard to make that procedure repeatable. Manually setting a fixed engine speed does not allow a user to take advantage of their real-time perception of how a tree responds to a particular shaking procedure. Setting a fixed or manual speed does not allow any intuitive sense or feel for the pattern, which is critical in converging upon an optimal shaking pattern without an automated solution. And, as discussed, the process is time-consuming. Other methods are very slow, while this method can literally be in real-time.

In the United States, there are three major players in the inertial trunk shaker space for fruit and nut harvesting. These systems typically feature a self-propelled chassis, a carriage, a shaker head with a two-jaw clamping system. They typically feature a two-eccentric system driven by a single motor coupled by belts and sprockets of different diameters to accomplish the fixed frequency ratio.

Orchard Machinery Corporation (OMC) is located in Yuba City, Calif. and produces a wide range of equipment for the orchard. Their current website address is www.shakermaker.com. They currently produce side-by-side systems (Magnum Catchall VII Series II), monoboom systems (Magnum Monoboom Series V), side-mount systems (Magnum Sprint Series V) and umbrella systems (Catchall V).

Orchard-rite Ltd., Inc. is located in Yakima, Wash. and produces several models, all targeted at nut shaking in particular. Their current website is www.orchard-rite.com. They produce a side-mount system (The Bullet) and a monoboom system (The MonoBoom).

Coe Orchard Equipment is located in Live Oak, Calif. and produces a variety of different equipment. Their current website is www.coeshakers.com. They produce a side-by-side system (The C7-E Shaker and L2-E Receiver), a side-mount system (S7 Side Mount Shaker) and a monoboom system (The M7 Mono Boom Shaker).

Therefore, there exists a need for a tree harvesting technology that can easily modify key characteristics of its shaker head to provide more optimal tuning to accommodate different trees and changing conditions. Those elements in question are the head's frequencies, specifically the individual frequencies themselves and in combination, the ratio between them.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The embodiments are illustrated by way of example and not limitation in the figures of the accompanying drawings, in which like references indicate similar elements, and in which.

DETAILED DESCRIPTION

Figure 1:
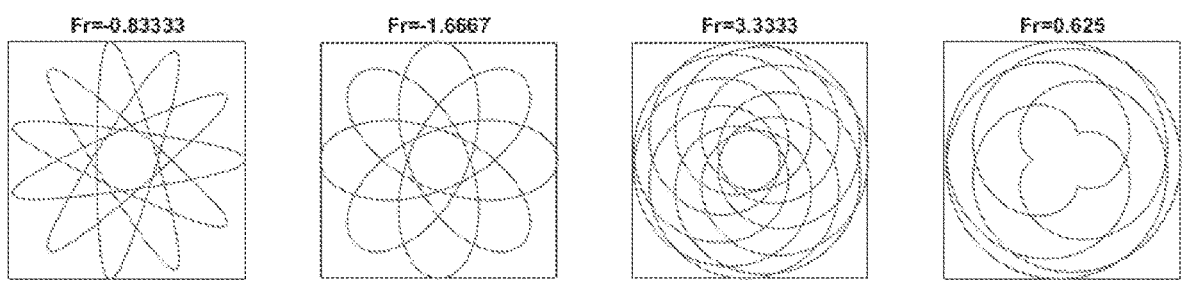
FIG. 1 depicts examples of trochoid shapes based on different frequency ratios.

Embodiments described within provide a tree harvesting technology that can easily modify key characteristics of its shaker head to provide more optimal tuning to accommodate different trees and changing conditions. The embodiments include graphical user interfaces for controlling a system that drive a shaker head's shaking frequencies, specifically the individual frequency of each rotating or vibrating mass and, in combination, the ratio between them. Embodiments include an apparatus that may control each of the eccentric frequencies individually—a Frequency-Frequency [Graphical] User Interface (FFUI). Driving the eccentric frequencies independently (Independent Frequency Control (IFC)) gives the flexibility to adapt the harvesting procedure to different trees and also to design patterns out in the field that evolve during the shake of an individual tree. Instead of making any assumptions about the right ratio or speeds, embodiments of IFC make the time-frequency profile of each eccentric independent. Since these frequencies combine to form a beat frequency as well, IFC also provides indirect control of the beat frequency resultant, which adds another facet of control to give more freedom to the person in the field who performs the tuning.

An embodiment of an FFUI discloses a way to control IFC. IFC provides more control over the process. And an FFUI embodiment abstracts the tuning process—providing a better way for the user to view and use the enhanced control provided by IFC. In a tuning process a user chooses the parameters for shaking the tree, e.g., frequencies, duration at a given frequency, etc. In the embodiment, a touch-screen graphical user interface maps the speeds and directions (two, signed variables) to the x and y coordinates of a graph. In other words, every position on the graph implies two, signed coordinates that correspond with the speeds (or frequencies) of the eccentrics. An embodiment also accounts for time, since the control of these two quantities may change with time. To do this, the x and y positions were plotted on the graph at a constant sample rate (10 Hz for the prototype). Thus, once we initiated the shake, the interface would begin to capture coordinate positions at that fixed sample rate and build the two frequency/time vectors. In this way, an embodiment may either "record" a new shaking pattern without controlling the machine, or the embodiment may record that new shaking pattern while a user controls the machine in real-time. Non-real-time editing (no automated recording) means that, in an embodiment, a user could edit these coordinate points and traverse both time and space (on the plane of the screen) to make large or small adjustments to the pattern. An embodiment may transform an abstract and 3-dimensional signal (f1, f2, t) into a 2-dimensional "gesture" with the time element determined by the speed of the gesture. An embodiment may be used in real-time, which allows the tuning to be interactive. An embodiment may allow non-real-time tuning processes (e.g., saved processes and processes created in total before being used) to be edited, which among other things would allow for short shakes and subtle changes. An embodiment may allow instantaneous feedback, e.g., the geometry, force output, and frequency combination at the current position. An embodiment may be run on a remote interface away from actual shaking apparatus, with the embodiment operating on a computing system that is connected to the shaking apparatus, e.g., tethered or wireless. An embodiment may allow a user to look away from the display and at the tree being harvested—allowing the user to make use of their own senses in determining the effectiveness of the shake taking place. If wirelessly connected, a user may move to an advantageous vantage point for observing and hearing how the tree is responding. An embodiment may also account for the setup of the shaking apparatus, e.g, the values of the eccentrics. An embodiment may allow more sophisticated and dynamic shaking patterns. Embodiments may improve tree harvesting technology, which in turn may result in reduced food prices.

Independent Frequency Control

Embodiments of IFC allow not only frequency magnitude control, but also directional control of the spinning eccentrics. This gives us the geometric freedom to vary what kind of trochoid we would prefer (Epitrochoid or Hypotrochoid), and to achieve a very low beat frequency (if the eccentrics are common-rotating ($F_r > 0$)) or a higher beat frequency (if they are counter-rotating ($F_r < 0$)). Having the flexibility in the field to make such changes in seconds, instead of hours, results in more optimal harvesting and ultimately more money for all parties involved.

Embodiments (both dual-rotor and linearly actuated) allow the quick modification of variables in the field to help with optimizing the shaking for a particular tree or type of tree, which overcomes a major limitation of typical systems. The independent control of the frequencies of two or more oscillators allows the shaker head to deposit appropriate amounts of energy into the frequency bands that are the most helpful for removing product and are the least destructive to the tree.

Figure 2:
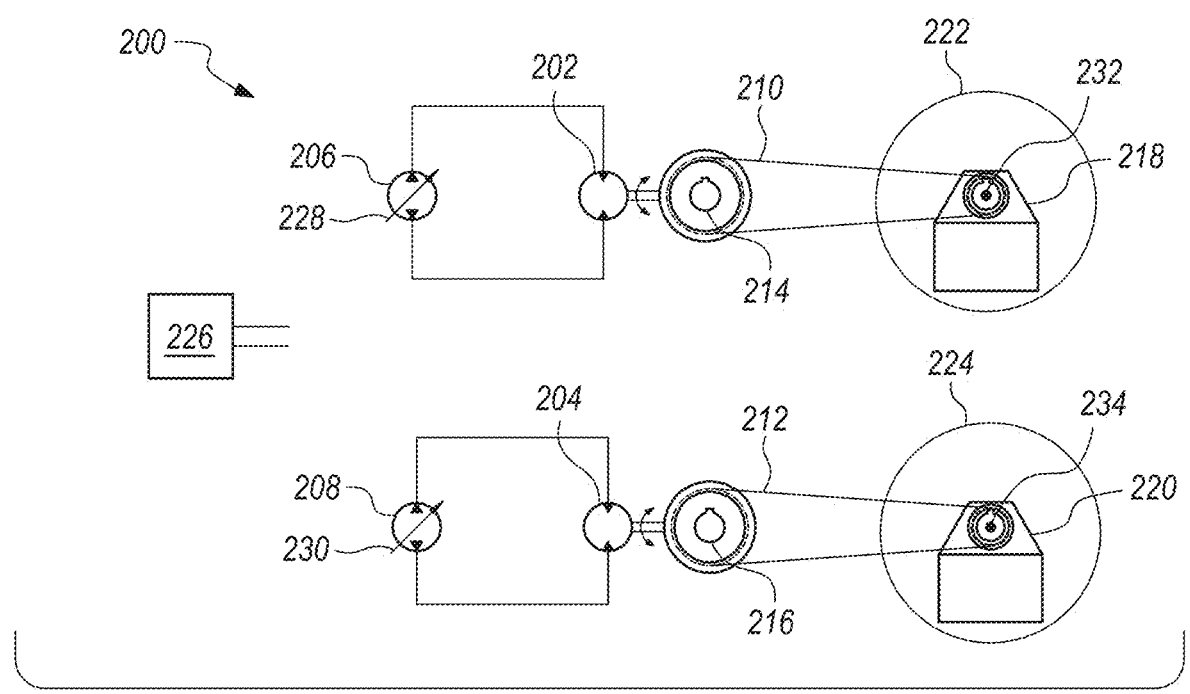
FIG. 2 is a schematic illustrating an embodiment of a system for independent frequency control of a shaker head.
Figure 3:
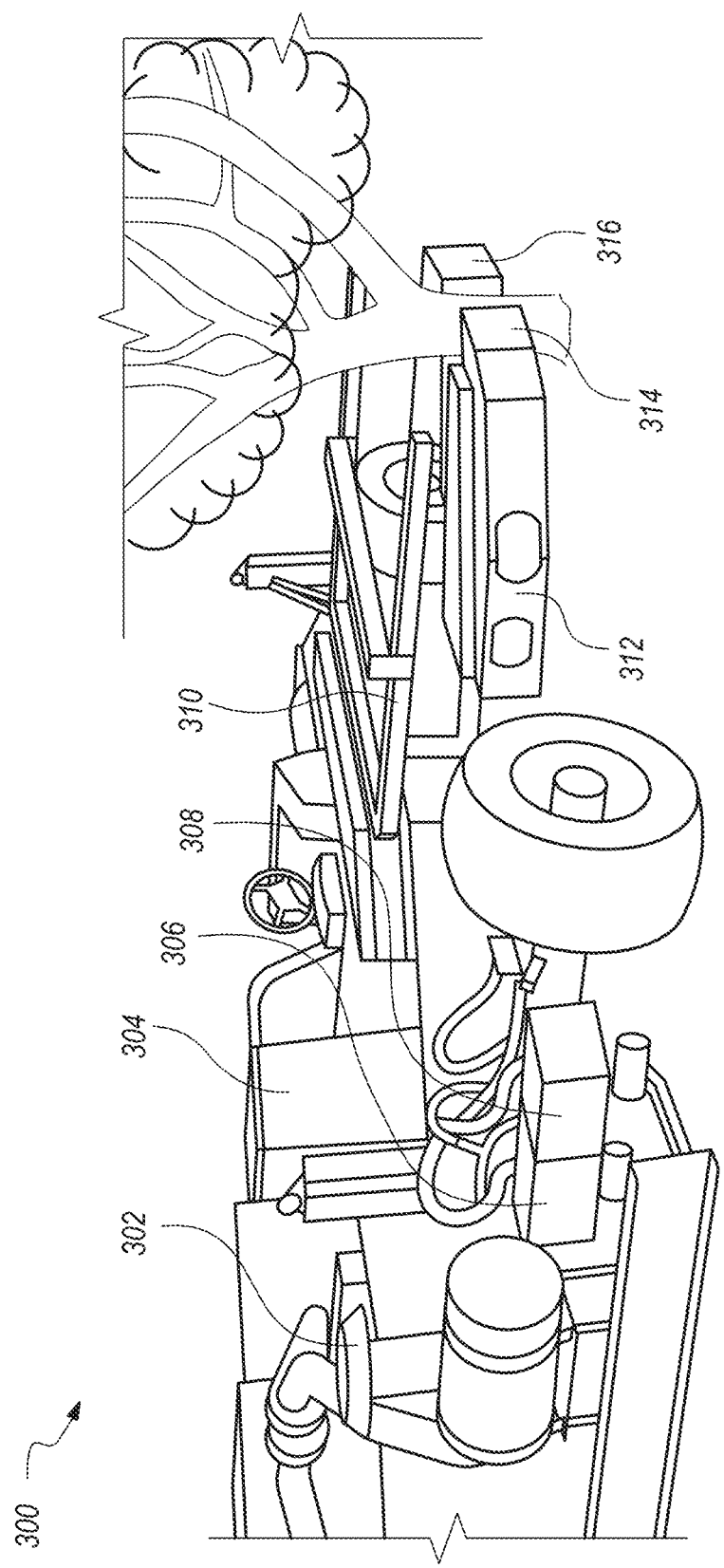
FIG. 3 is a perspective view illustrating an embodiment of a system for independent frequency control of a shaker head employing a dual rotary-actuated shaker head.

FIG. 2 is a schematic illustrating an embodiment of a system 200 for independent frequency control of a shaker head (see, e.g., FIG. 3, head 312). In FIG. 2, a prime mover 226 (e.g., a diesel engine) drives two fixed-displacement hydraulic motors 202, 204 with two variable displacement hydraulic pumps 206, 208. In turn, pumps 206, 208 drive fixed displacement hydraulic motors 202, 204, which by way of sprockets 214, 216 and belt couplers 210, 212 rotate eccentric masses 218, 220 within chambers 222, 224 about axes 232, 234. The rotation of each eccentric mass 218, 220 creates a vibration of the system based on the speed of the rotation. For this reason, systems with rotating masses may be "speed" controlled or "frequency" controlled. The variable displacement, plus directional capabilities (forward or reverse) of pumps 206, 208 provide the independent control needed to accomplish independent frequency control of an eccentric mass 218 and an eccentric mass 220. In the embodiment, variable-displacement pumps 206, 208 each have an electro-hydraulic control unit 228, 230 that interfaced with an onboard computing system (e.g., a computing device 2100, FIG. 21) to allow for storing velocity profiles and further interfacing to graphical user interfaces, e.g., embodiments of FFUI.

The configuration of FIG. 2 may be modified in several ways to optimize the energy transfer. For example, by pairing a variable-displacement motor (instead of fixed displacement motors 202, 204) with variable displacement, bi-directional pumps 206, 208 the hydraulic energy transfer stages may be optimized (e.g., as when an automotive transmission optimizes the power transfer from the engine to the tires). For example, for initial start-up shaking speeds, the largest displacement on the variable displacement motor may be used to maximize the torque. Then, then, for higher speeds, a smaller displacement may be used—decreasing torque for increased speed.

Embodiments may employ linear actuators. For embodiments employing linear actuator configurations, it is also preferable that each actuator is controlled independently as was described with respect to the dual-rotor (dual rotating mass) shaker configuration. If not independently controlled, e.g., if a pair of linear actuators were coupled through gearing or circuit topologies that control the actuators in a coupled way relative to each other, the linear actuator arrangement would re-create many of the limitations of the typical dual-rotor actuator.

Linearly-actuated shakers have the ability to generate multiple frequencies at the same time due to the superposition of signals in time. This allows a nearly arbitrary number of primary frequencies with all of the implied beat frequencies that result from those primary frequency interactions. The potential geometric output of linearly actuated systems with two or more actuators that are at least slightly askew is limited by the physical constraints of the actuators (force, displacement, etc.) and the control capability of the control system (control bandwidth, sample time, etc.). In this sense, for embodiments using linearly-actuated shakers the frequency content and geometric position output in the plane of shaking is almost arbitrary.

In an embodiment, a system for independent frequency control of a shaker head may have closed-loop control of the eccentric speed. In the embodiment, an eccentric shaft has a synchronous sprocket. That sprocket is driven directly by a sprocket attached to the shaft of a hydraulic motor (e.g., hydraulic motor 202, FIG. 2). In the embodiment, above the drive sprocket (e.g., sprocket 214, FIG. 2) there may be an additional, smaller sprocket that drives a smaller synchronous belt that goes back to an absolute encoder assembly. With such an absolute encoder assembly, the absolute position of the eccentric shaft may be monitored and used for data acquisition and closed-loop control. An appropriate encoder sensor is made by IFM, model RM8002. An incremental encoder may also be used, provided it can survive the high vibration environment. In the embodiment, an automatic controller may adjust the displacement of a hydraulic pump that controls the speed of a hydraulic motor driving the eccentric mass (e.g., mass 218, FIG. 2). In the embodiment, for feedback (i.e., closed-loop control), the discrete derivative of the digital position of the encoder is calculated, which gives the speed and direction of the motor. This feedback may be fed into a PI controller with gain scheduling (depending on the eccentric configuration) for automatic closed-loop control. Since the reference signal is in terms of the speed over time, this provides the requisite reference and feedback signals to make control automatic. In an embodiment, the speed of the eccentric may be measured by a flow sensor along the flow path between the pump and the motor, since hydraulic oil is essentially incompressible for these purposes. An incremental encoder could have been used (assuming that it could survive the high vibration environment).

Using feedback for closed-loop control purposes is beneficial for several reasons. For a first reason, knowing the actual output speed of the eccentric provides the ability for more consistent, year-to-year shake patterns. Knowing the desired output speed and driving to that output speed reduces considerably the uncertainty in the output speed that may be caused by environmental factors such as oil temperature and component wear. Thus, feedback control reduces the need to re-tune the shaker apparatus to compensate for such environmental factors and improves the consistency of a shake. Consistency is an aspect of the ongoing optimization efforts that growers and harvesters aspire to. For a second reason, because of the complex dynamics experienced by the motors and eccentrics during the course of a shake sequence, automatic control using feedback helps reject the disturbances naturally imposed by the moving-frame of the shaker head and the non-constant loads that present themselves to the motors. By the same token, since each tree responds differently, it is desirable to continue to use the same true shake sequence and not make it dependent on the tree's response to this reference signal. Feedback control allows for individual tailoring (a particular, individual tree receives a custom shake), or group tailoring (each tree of a type of tree receives the same shake), to provide a consistent shake sequence. For a third reason, the transient response may be improved compared to a non-feedback scenario, allowing the proper frequencies and forces at the right time. And steady-state error may be eliminated by using an integrating term in the controller topology (e.g. PI or PID structures).

FIG. 3 is a perspective view illustrating an embodiment of a system 300 for independent frequency control of a shaker head employing a dual rotary-actuated shaker head 312 (also "dual-rotor shaker head"). In FIG. 3, a prime mover 302 is a diesel engine. Prime mover 302 is connected through a gearbox to two independently controlled, variable-displacement hydraulic pumps 306, 308. Pumps 306, 308 are controlled electronically by onboard computing system 304 (within the box). Pumps 306, 308 are hydraulically connected to hydraulic motors (not shown) attached to shaker head 312. Carriage 310 is used to position shaker head 312 with respect to the tree. Hydraulic cylinders cause jaws 314, 316 of shaker head 312 to clamp to the tree. Properly clamped to the tree, shaker head 312 becomes rigidly coupled to the tree and, as a result, may efficiently impart the combined vibratory energies of the independently-controlled force generators (e.g., eccentric rotating masses 218, 220, FIG. 2) into the tree. Jaws 314, 316 have pads that interface between the steel of head 312 and the wood of the trunk.

In the embodiment, shaker head 312 is mounted on overall shaker machinery. The machinery, as is typical, includes a self-propelled chassis with its own power source. In FIG. 3, shaker head 312 is oriented perpendicularly to the wheels' direction of travel. These are called "side-mount" machines. In some embodiments, a shaker head may be mounted on a tractor three-point or skid-steer platform. In some embodiments, shaker head may be mounted to the front of the chassis, which are typically referred to as "mono-boom" machines.

The side-mount chassis of FIG. 3 may be a three-wheeled, or four-wheeled design (not eccentric wheels, but ground-drive wheels). In FIG. 3, shaker head 312 is to the right of the operator cab on a carriage 310, which positions the shaking head appropriately for clamping to the tree using jaws 314, 316 and subsequently for shaking. Shaker head 312 is connected to carriage 310 through some manner of hanger or isolator which provides vertical support but allows head 312 to float as much as possible in the horizontal plane. This basically makes shaker head 312 a pendulum. Thus, it is preferable to make the hanger (not shown) as long as practically possible, to allow nearly planar motion of the head.

Shaker head 312 needs some means of attaching itself (usually termed clamping) to tree. This is typically accomplished by a two-jaw 314, 316 configuration. Others may have three jaws. A rubber pad is typically used to interface with bark of tree to prevent hurting the tree, since most of the time the shaker head is made of steel or another similarly rigid material, so that vibrations may be transmitted efficiently.

The first phase of a shaking sequence involves the positioning of the chassis to get carriage 310 within range of the tree. The second phase involves carriage 310 moving as allowed to position shaker head 312 in the best position to clamp onto the tree. In the third phase, shaker head 312 causes jaws 314, 316 clamp onto the tree. In an embodiment, jaws 314, 316 may move in parallel, opposing directions, and in other embodiments, the jaws may clamp using, e.g., a scissoring action. Once the tree is clamped within jaws 314, 316, the tree-shaker head vibration system is position, clamped, and ready to shake. The fourth phase includes the actual shaking process, which might be different for each tree (as is possible in various embodiments), or may be a perfect copy of the process performed on the previous tree. Once the shake sequence phase has been completed and head 312 has stopped vibrating, jaws 314, 316 are unclamped from the tree, carriage 310 pulls head 312 back from the chassis, and the chassis positions the vehicle for the next tree.

One aspect of an embodiment is the ability to not just change the frequencies independently, but to change them independently and change them during a shake sequence—during the actual shaking. This can be meant two ways and both ways are intended. In an embodiment, the shake sequence may be a pre-programmed set of speeds that generate a proportional set of frequencies during the course of the shake (as discussed, both wheels have independent program vectors). In another embodiment, the user may modify and tune the frequencies in real-time during the shake, the frequency profile for each mass being modified and tuned independently. Being able to store a frequency profile and also program or change a frequency profile in real-time is enabled by a computing system (e.g., computing device 2100). In an embodiment, a pre-programmed shake sequence may be initiated and, during the pre-programmed sequence, the user may re-program or change the frequency profile in real time.

Figure 4:
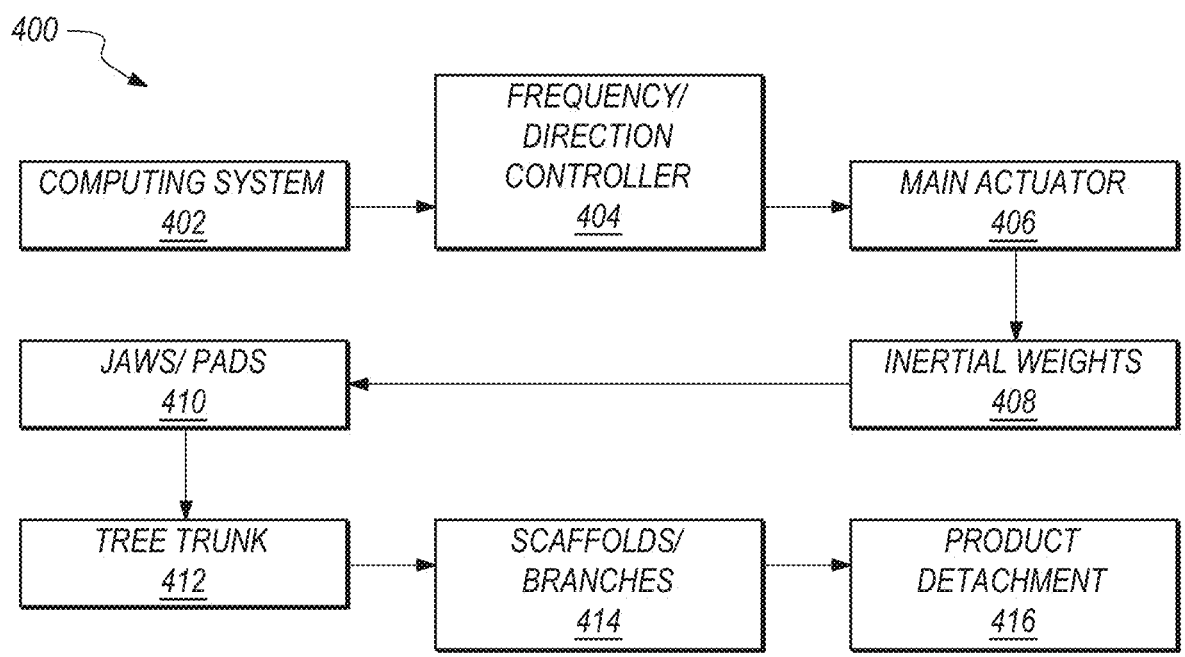
FIG. 4 is a diagram of a control influence chain for an embodiment of independent frequency control of a shaker head.

FIG. 4 is a diagram of a control influence chain 400 for an embodiment of independent frequency control of a shaker head. FIG. 4 illustrates how a computing system 402 (e.g., computing system 2100 (FIG. 21)) may interface with a frequency/direction controller 404 to influence a main actuator 406 (e.g., the hydraulic systems depicted for rotating an eccentric mass (e.g., mass 218, FIG. 2). Main actuator 406 influences inertial weights 408, which, when clamped to a tree by jaws/pads 410, influence, in turn, tree trunk 412, branches 414, and finally, product 416. FIG. 4 illustrates how the computing system fits into the signal with the actuators, etc. In an embodiment the FFUI is part of the computing system. Examples of the computing system are described later with regard to FIGS. 20 and 21.

Figure 5:
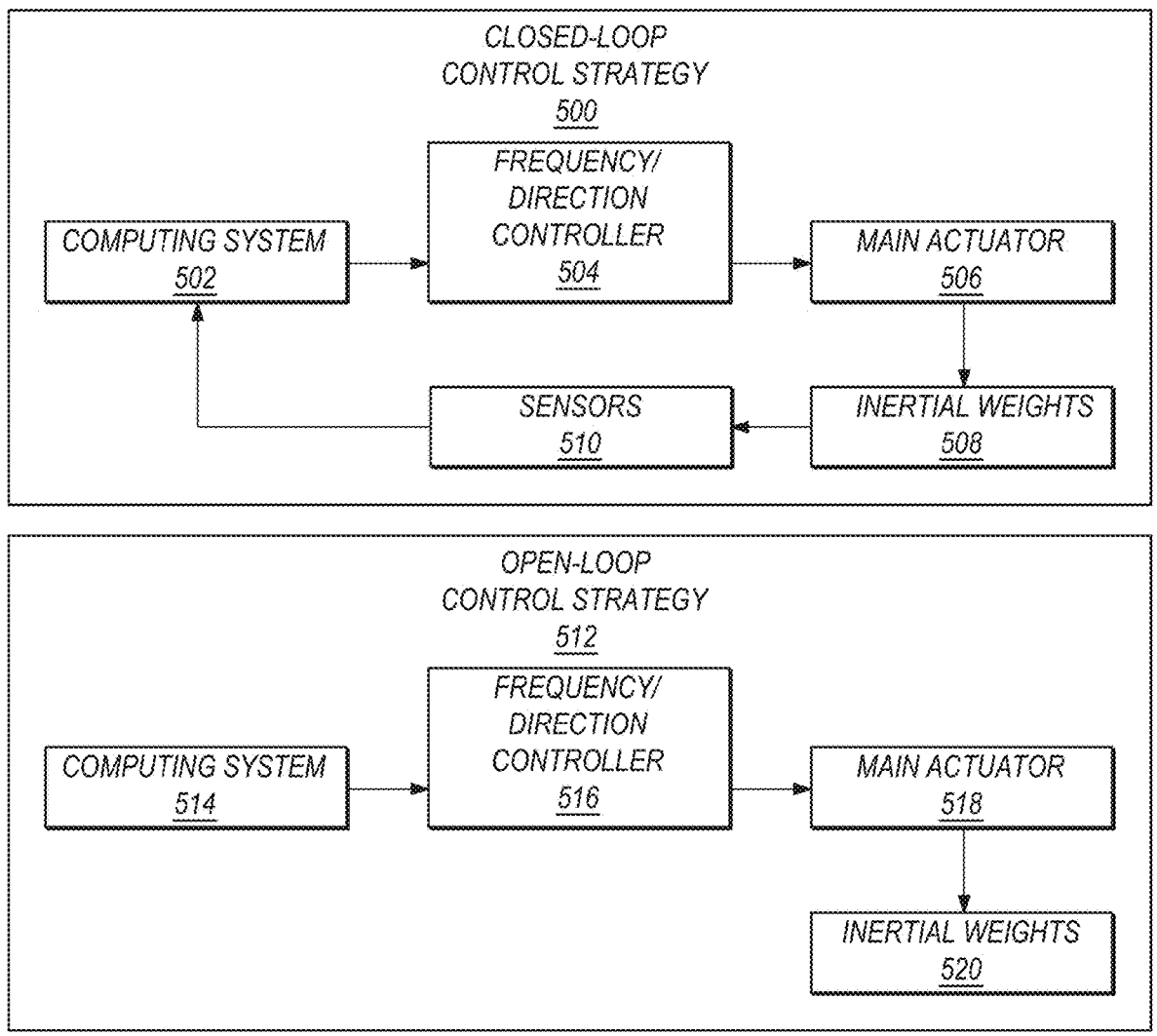
FIG. 5 is a diagram illustrating and comparing closed-loop control of an embodiment of independent frequency control of a shaker head vs. open-loop control of an embodiment of independent frequency control of a shaker head.

FIG. 5 is a diagram illustrating and comparing closed-loop control 500 of an embodiment of independent frequency control of a shaker head vs. open-loop control 512 of an embodiment of independent frequency control of a shaker head. An embodiment may drive the eccentric using an open-loop (not using an automatic-feedback-controller) control 512. An embodiment may drive the eccentrics using a closed-loop control 500 (including a feedback-controller) in order to eliminate (speed accuracy) tuning steps, increase accuracy and consistency and improve transient response. In an example embodiment using open-loop control 512, a computing system 514 provides input to a frequency/direction controller 516, which provides input to a main actuator 518, which provides input to one or more inertial weights 520. In an example embodiment using closed-loop control 500, a computing system 502 provides input to a frequency/direction controller 504, which provides input to a main actuator 506, which provides input to one or more inertial weights 508. Sensors 510 may detect, for example, various aspects of the movement of inertial weights 508 and provide that input to computing system 502, which may modify subsequent input to Frequency/direction controller 504 based on the input from sensors 510.

In times past, the industry attempted to find "silver bullet" shaking setups in the form of a magic pattern (geometry) or magic ratio (since, typically, the ratios are fixed). In contrast, embodiments allow a particular shake sequence to have as complex or simple a velocity profile as the user would prefer ("velocity profile" and "frequency profile" may used interchangeably in this specification—where a velocity profile refers to a rotating eccentric the velocity of rotation determines the frequency). That is, an embodiment may be controlled to imitate a single, specific machine by creating fixed speed/ratio profiles or may be controlled to imitate a combination of a number of different machines (a number of different speed/ratio profiles)—depending on what may be considered best for the tree.

Thus, with embodiments, as the tree evolves, the shake sequence may evolve in an optimal way along with it. This ability to change the shake frequency with time changes the equations, slightly, making $F_1$ and $F_2$ functions of time. In the equation below, $F_1$ and $F_2$ have been expressed as functions of time.

$$x(t)=E_1 \cos(F_1(t)*t)+E_2 \cos(F_2(t)*t) \quad (\text{Eq. 3})$$

$$y(t)=E_1 \sin(F_1(t)*t)+E_2 \sin(F_2(t)*t) \quad (\text{Eq. 4})$$

Tuning the System

Having the ability to change frequencies dynamically is very helpful in giving freedom to the operator or supervisor in the field, but also presents another challenge: determining what the frequencies should be now that the frequencies may be changed at will. In an embodiment, the tuning process is abstracted to make the tuning process easier and more intuitive.

At a high level, there are several ways to begin tuning. If simplicity is the goal, tuning may use terminology with which the industry is familiar, such as ratio, speed, and duration. In an embodiment, with the need to view frequency ratios that vary, a graphical user interface may display a timeline view of the speeds. In the embodiment, an interface shows the speeds of each eccentric mass on the vertical axis and time on the horizontal axis. Each timeframe can be modified to request a different speed of an individual eccentric at that time. Finally, viewing tuning from the frequency/shape/force point of view, a user interface may map the two frequencies being tuned to a two-dimensional plane where each axis is one frequency. Then, the user via the interface may record or directly control the frequency progression as a series of coordinates in that plane.

Each of these interfaces is useful in different scenarios. For example, when shaking prune trees, which are not typically as challenging to tune for, it may be most expedient to start shaking with a ratio of 0 (so frequency 1 is 0 and frequency 2 is whatever is chosen) and just see which frequencies the trees respond best to in a simple way. Once a rough exploration has been done, then a ratio that provides an efficient, safe geometry pattern for removal should be chosen. Finally, the duration of shake should be chosen. Since prune trees are somewhat brittle, geometric patterns with "points" that are too sharp can result in broken branches. Regarding "points," referring to FIG. 1 for example, and the plot on the far left with $F_r=-0.83333$, the points are the tips of the flower petals of the geometric output pattern. Sometimes points may be very sharp, sometimes they may be more like big huge loops (as in the other examples of FIG. 1). Also, because higher frequencies tend to work better with materials that are relatively more rigid, the frequency ratio should likely be negative so that the beat frequency will be higher than the two primary frequencies—a negative frequency ratio corresponds to a beat frequency that is higher than the two primary frequencies.

On the other end of the spectrum, olives trees are extremely difficult to effectively shake and the tuning is far more complex. This is true for several reasons. First, the typical pruning style of olive trees is a "weeping willow" shape, which is more challenging to excite. Second, the olives have relatively low mass compared to other fruits/nuts. And third, since shaking an olive tree takes much longer than other crops (e.g., 10-15 seconds compared with 1-3 seconds for others), there is more opportunity for both the tree and the shake to evolve. To begin tuning an IFC-based shake for an olive orchard, an embodiment of a frequency/frequency graphical user interface may be valuable, since it allows a person to tune the shake in real-time while watching the tree and seeing it's response.

In an embodiment of a frequency/frequency control interface a user may move a finger or stylus away from the origin to a location on the interface plane (frequency 1 v. frequency 2) where the tree seems to respond the best. The embodiment is somewhat like reading a topological map, except that the user traverses the map with the user's finger or stylus and evaluates the effectiveness by watching (and listening) to the response of the tree. As a tree evolves in the shake, the user may begin to see how the shake needs to evolve to keep the tree "in the zone" of optimal shaking. This is an iterative and exploratory process that will be different each time, but is actually much easier than it sounds once a user has a few minutes of training with the interface.

The Frequency/Frequency User Interface (FFUI)

Figure 6:
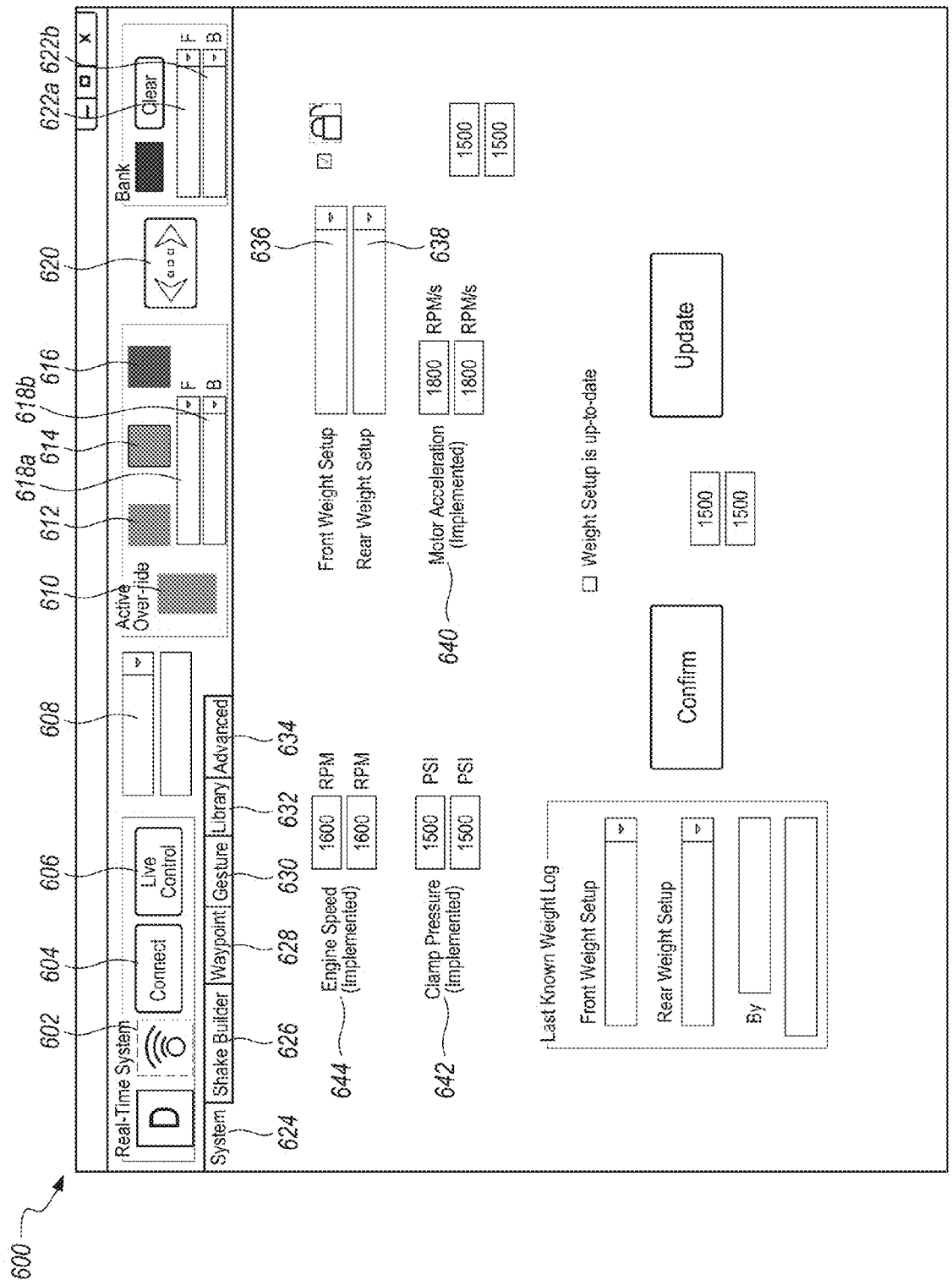
FIG. 6-19 illustrate screenshots of embodiments of user interfaces for independent frequency control of a shaker head.

FIG. 6 illustrates a screen shot 600 of an embodiment of an FFUI upon opening the interface. In FIG. 6, an animated icon 602 indicates that the FFUI is actively connected to the onboard computer (e.g., computing system 304 (FIG. 3), computing device 2000 (FIG. 20)). Command button 604 commands the FFUI to initiate a connection with the onboard computer. A live control initiation button 606 puts the FFUI into the state of real-time, interactive control of the shaking frequencies. A current state button 608 indicates the current state of the machine (e.g. idle, clamping, clamped, shaking, unclamping, etc.). An active state box 610 goes to a lighter shade when in an over-ride mode, which means that the onboard operator's choice for shake is over-ridden by the user of the GUI. If it is a darker green, then the choice is in the hands of the operator. If one of shaking bank active slots 612, 614, 616 is checked it indicates that the shake profile in the checked bank is actively selected for performing a shake.

Upon the FFUI taking control of shaking either through live control 606 or through dictating which shaking bank active slot is to be used (green (active slot 612), orange (active slot 614) or red (active slot 616)) an over-ride indicator is lit (i.e., goes to the lighter shade). Each of active slots 612, 614, 616 is for storing a pre-defined shake pattern. Whichever bank active slot 612, 614, 616 is currently chosen will have a black check-mark in it. A front eccentric configuration 618*a* and a back eccentric configuration 618*b* (nothing is shown now since it is not connected to the machine, see, e.g., FIG. 7) indicate the eccentric configuration for the "front" and "back" eccentrics (relative to the direction of travel of the chassis). A transfer button 620 transfers shake profiles back and forth between the bank and the active slots 612, 614, 616. The bank holds shake information (temporarily) for the FFUI. This is akin to the clipboard for copy/paste actions. In general, although active slots 612, 614, 616 remain the same color, in general, color pads may indicate they are active by going from a darker version of their color to a lighter version.

Active tabs 624, 626, 628, 630, 632, 634 correspond to different feature groups. System tab 624 is for setting global options. Shake builder tab 626 allows simple parametric construction of shake profiles, using, e.g., base frequency, ratio, duration, and eccentric configuration. Waypoint tab 628 displays the time-editing user interface that allows the user to interact and sculpt the shake in the time/frequency domain. Gesture tab 630 displays the screen of the FFUI that actually allows the user to interact with the pattern in the frequency/frequency domain. Library tab 632 displays a list of an arbitrary number of stored shake profile for potential recall and use. Advanced tab 634 houses other functions such as onboard troubleshooting. Parameters 636-644 may be set on the system level. For example, Front weight setup 636 refers to the setup of the front eccentric, and rear weight setup 638 refers to the setup of the rear eccentric. These are entered after the eccentrics are adjusted. Motor acceleration 640 is also occasionally called "slew rate." Clamp pressure 642 refers to the pressure within the hydraulic cylinders that clamp shaker head 312 to a tree (see FIG. 3).

In an embodiment, the display pictured in FIG. 6 is from the display of computing system 304 (FIG. 3). In an embodiment, the display is from a computing system wirelessly connected to computing system 304. In an embodiment, two or more computing systems may be connected to computing system 304, with each of the two or more computing systems able to control different aspects of a shake profile. With such an embodiment, two users may each control different aspects of a shake. For example, a first user could control the shake frequency magnitude and a second user could control the frequency ratio. With such an embodiment, one user may use two computing systems to control more aspects of the shake in real time. For example, the user could use a first computing system to adjust F1 and F2, and use a second computing system to adjust total force output and geometric shape.

Figure 7:
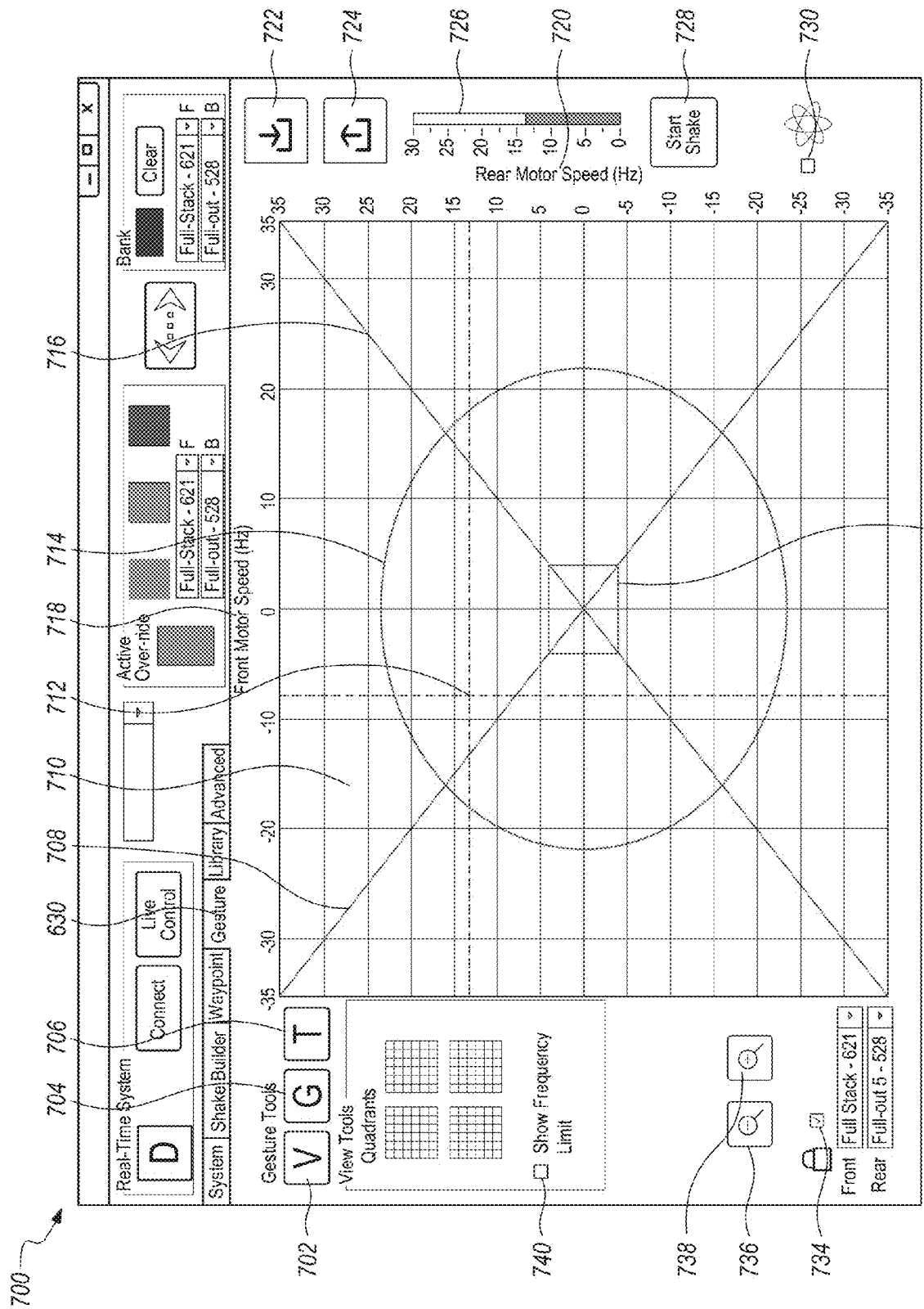

FIG. 7 illustrates a screen shot 700 of an embodiment of an FFUI showing gesture tab 630. The features of gesture tab 630 allow the user to interact with the shaking pattern in the frequency/frequency domain. A shaking pattern is not yet shown in FIG. 7. In FIG. 7, V button 702 displays the view toolbar button (the view toolbar is shown), which has visibility controls such as which quadrants to view and whether or not to show the current frequency limit. G button 704 displays the guide toolbar button, which houses control for such features as ratio guide and force guides (see, e.g., FIG. 19). T button 706 displays the time-edit toolbar button which houses functionality used to navigate in the time domain and make edits to the existing pattern. A ratio guide line 708 is the Fr=−1 ratio guide line. A main chart area 710 (largest "square") of the FFUI will display the eventual shake profile. A cursor 712 is located at the current shaking frequencies (showing about −8 Hz for the front motor speed and 13 Hz for the rear motor speed). A force boundary 714 shows the maximum force for which the current eccentric setup is rated for (30 k-lbf, set elsewhere in the FFUI). Ratio guide line 716 is the F=1 ratio guide line. A front motor speed axis 718 is the reference line for front motor speed (horizontal). A rear motor speed axis 720 (vertical) is the reference line for rear motor speed. Download-from-bank button 722 (analogous to a paste function) pulls a shaking pattern from the bank into the FFUI. An upload-to-bank button 724 (analogous to the copy function) pushes the current shaking pattern from the FFUI into the bank. A cursor position force feedback gauge 726 gives immediate feedback about the current cursor position's eccentric/frequency combination peak force. A start shake button 728 initiates the recording of a new shake in real-time. A show-pattern checkbox 730 either hides or shows a small window depicting the instantaneous geometric pattern feedback for the current cursor position (no geometric pattern is shown yet). The frequencies near the origin do not impart enough energy into the tree to be very useful. So, the region is typically avoided for the majority of a shake pattern. However, an embodiment uses a box 732 to signal the initiation of a shake. In the embodiment, after pressing "Start Shake," contacting the display outside box 732 and then bringing the stylus (or, e.g., the user's finger) across box 732's boundary initiates a shake. Generally, approaching a quadrant line means going through dead zones. Crossing zones is therefore a time-sink and inefficient.

An unlock/lock synchronization checkbox 734 makes the eccentric configuration drop-down boxes below checkbox 734 editable or not editable based on whether "locked" checkbox 734 is checked or not. If checkbox 734 is checked then the drop-down boxes represent (are "synchronized" to) the current setup of the shaker head—they are not editable (but are viewable). A zoom-out button 736, when clicked, shows, more frequency space for the current view. A zoom-in button 738, when clicked, shows less frequency space for the current view. A show frequency limit checkbox 740 shows or hides the current shaking frequency limit based on current IFC parameters such as engine RPM. Lastly, quadrants 742 indicates that the associated button can zoom in on a single quadrant or group of quadrants for higher-fidelity editing and control. Most shaking patterns remain in a single quadrant because in going from one quadrant to another, one or both eccentrics must slow to zero hertz and then speed up again, which slows the shaking process considerably.

Figure 8:
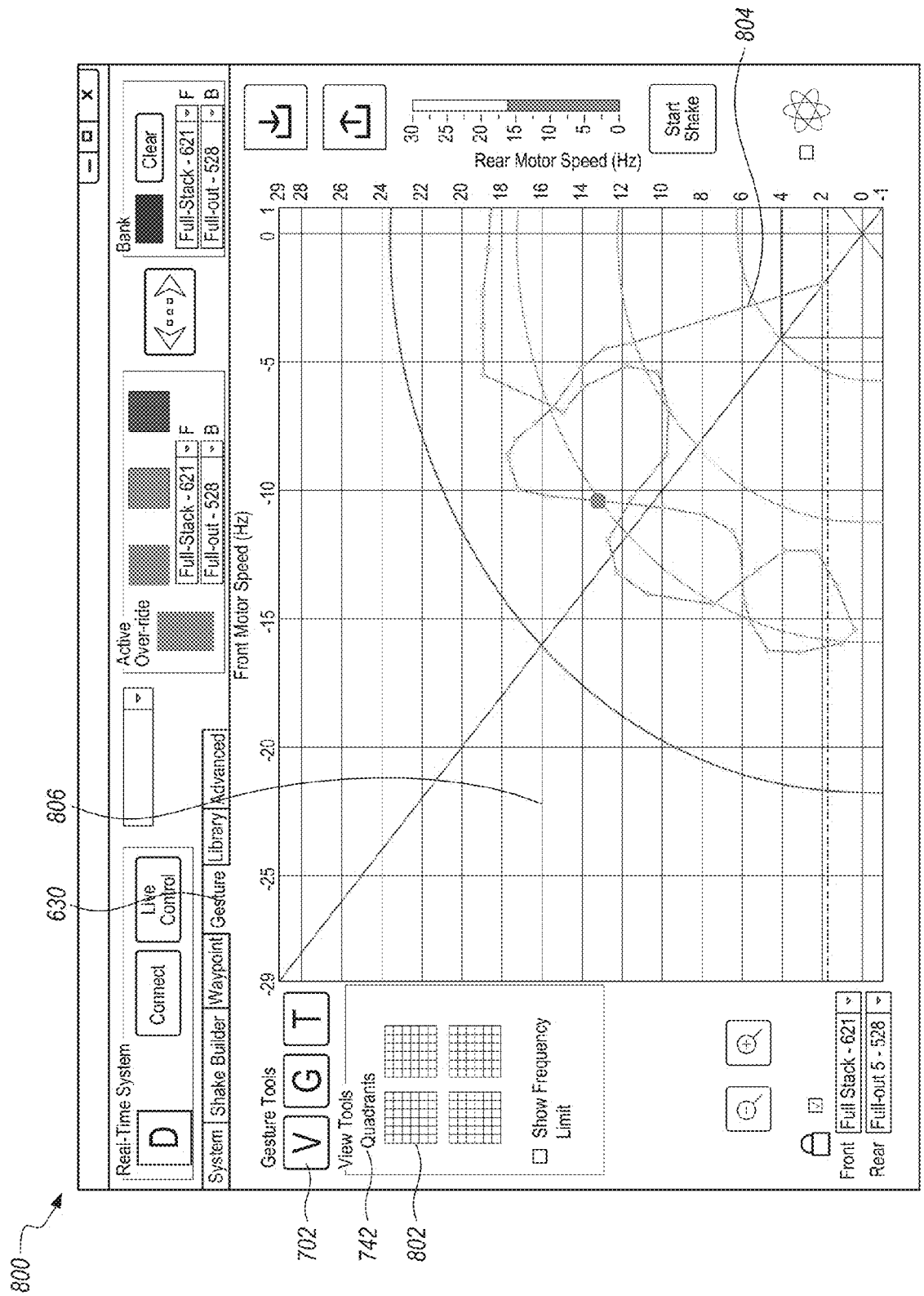

FIG. 8 illustrates a screen shot 800 of an embodiment of an FFUI. In FIG. 8, the user has selected to view only the $2^{nd}$ quadrant 806, in order to enlarge it and edit with more precision. To do this, the user clicked on V button 702 display the view toolbar. Then the user then clicked on a $2^{nd}$ quadrant button 802 within quadrants 742. The main chart area then became dedicated to $2^{nd}$ quadrant 806 so that editing could be more precise. In FIG. 8, line 804 connecting the dots represents a shaking pattern. Time zero is represented by the end dot in the fourth quadrant closest to the origin. Each subsequent dot represents the front eccentric speed (the speed of the eccentric mass in front, as determined by the direction the of chassis travel) and rear eccentric speed (the speed of the eccentric mass in the rear, as determined by the direction of chassis travel) at the subsequent point in time.

Figure 9:
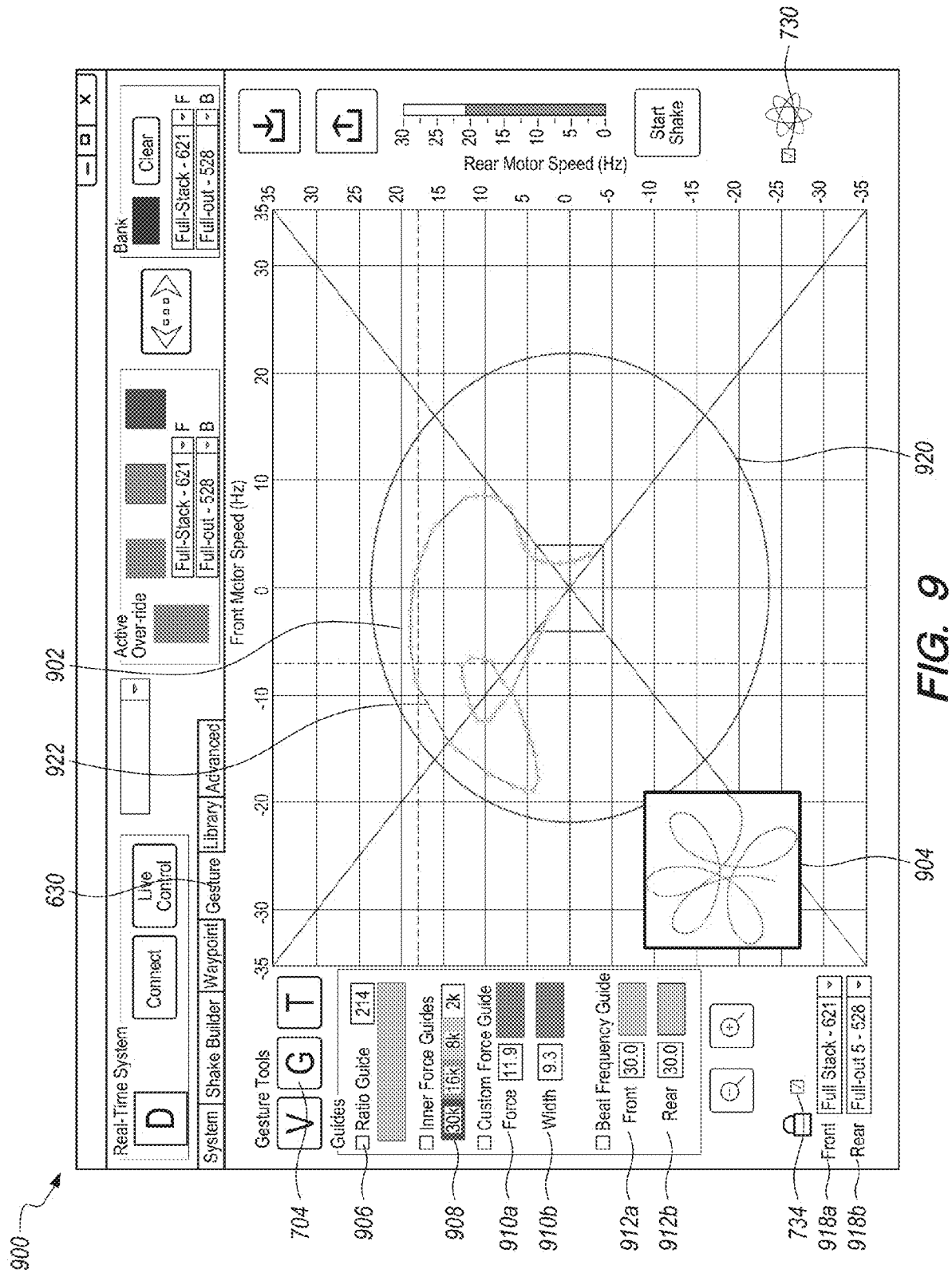

FIG. 9 illustrates a screen shot 900 of an embodiment of an FFUI. In FIG. 9, line 922 connecting the dots represents a shaking pattern. Time zero is represented by the end dot in the fourth quadrant closest to the origin. Each subsequent dot represents the front eccentric speed and rear eccentric speed at the subsequent point in time. The frequencies of the front and rear motors at the position of a cursor 902 (a dashed blue cross-hair 922), combined with a current eccentric setup (front eccentric setup 918*a*, rear eccentric setup 918*b*) results in an instantaneous geometric output shaking pattern, within an inset window 904. Inset window 904 will move to a different quadrant if the cursor is positioned within the same quadrant as inset window 904. The visibility of inset window 904 is toggled via a checkbox 730. In FIG. 9 G button 704 has been clicked making the guide toolbar active. The guide toolbar includes an Fr ratio guide 906, inner force guides 908, custom force guides 910*a*, 910*b*, and beat frequency guides 912*a*, 912*b*. Inner force guides 908 includes a "30k" value in a red field. This corresponds to a red maximum force guide 920 (an oval). In FIG. 9, none of the guide boxes are toggled, so guide lines themselves are not shown. They are discussed within. However, for each specific point on the Frequency/Frequency plane, the Fr is fixed. For that reason, and with configurations in front eccentric setup 918*a*, rear eccentric setup 918*b*, the instantaneous pattern output may be displayed in inset window 904—the pattern is specific to the configuration and eccentric setup.

Figure 10:
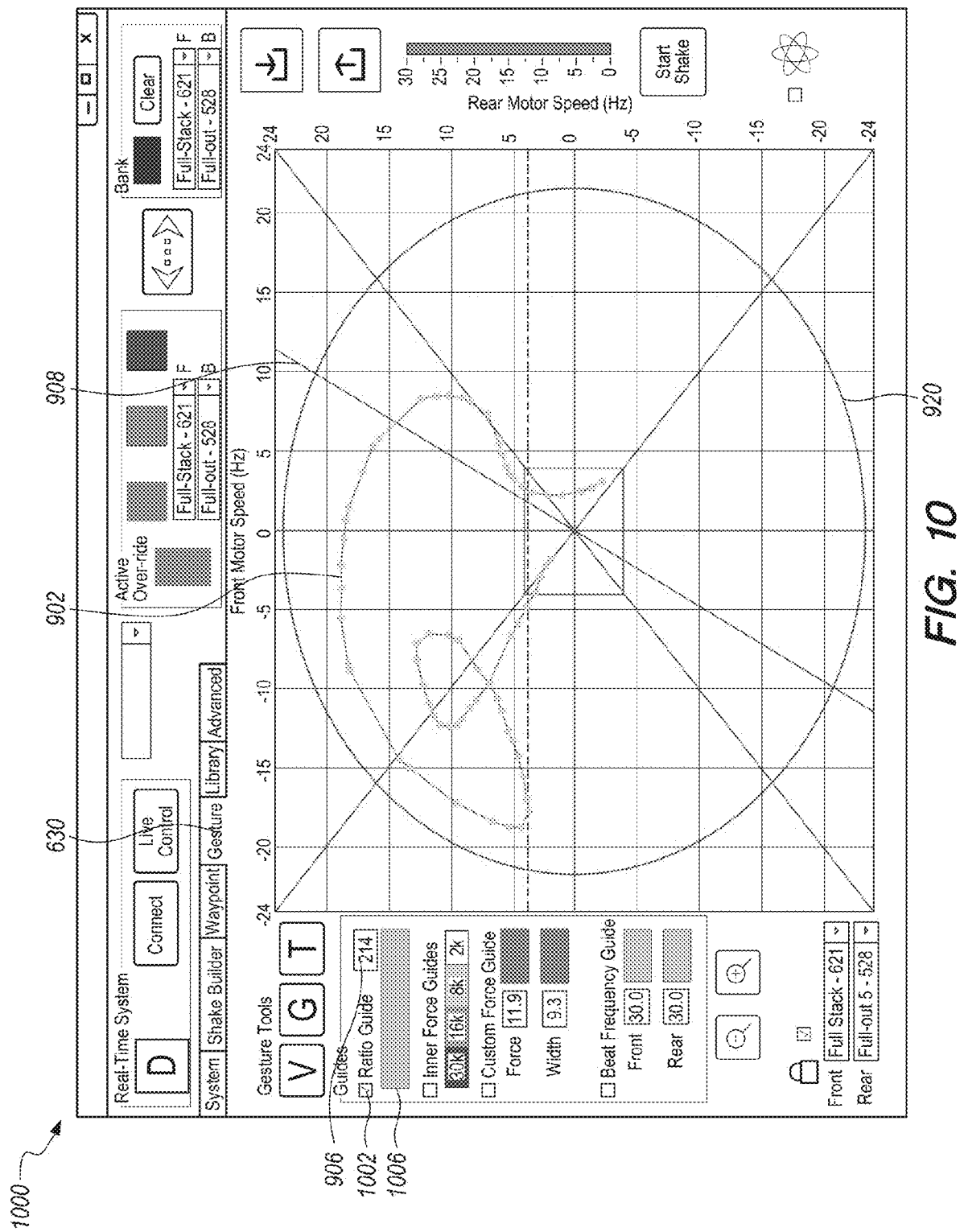

FIG. 10 illustrates a screen shot 1000 of an embodiment of an FFUI. In FIG. 10, the user has checked a ratio guide visibility box 1002. Current ratio value 906 reads 2.14 In the chart graphics a corresponding ratio guide line 908 (gray) has the slope of current ratio value 906 (2.14). The slope of ratio guide line 908 corresponds to a constant geometric output pattern (see, e.g., inset window 904, FIG. 9). A ratio guide pad 1006 is the same color (gray) as ratio guide line 908 and gives the user the ability to position ratio guide line 908 using the cursor so that the alignment and adjustment can be faster, more intuitive and more interactive. Positioning ratio guide line 908 may be performed by tapping once on ratio guide pad 1006, which highlights in yellow current ratio value 906 and causes ratio guide line 908 to dynamically adjust to intersect with the location of the blue, cross-hair cursor.

The purpose of ratio guide line 908 and other guide lines is to highlight or bound shake characteristics that may make for a more efficient harvest. The guide lines may, for example, be set up by the user based on previous experience, or may be based on a previous shake. Different trees are known to respond better to different patterns. For a given point on the Frequency/Frequency display, changing ratio guide value 906 would change the geometric output pattern (see, e.g., inset window 904, FIG. 9).

Figure 11:
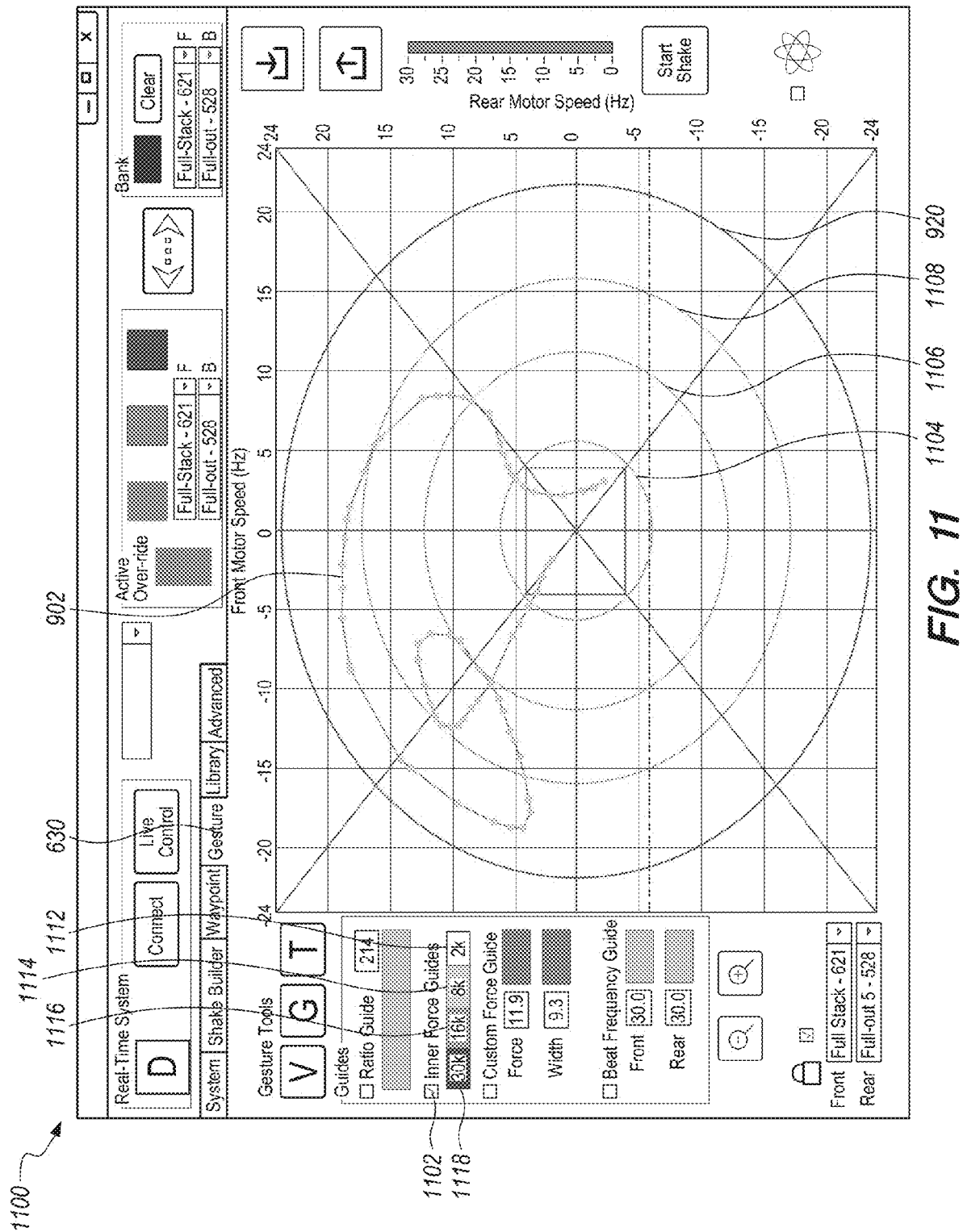

FIG. 11 illustrates a screen shot 1100 of an embodiment of an FFUI. In FIG. 11, an inner force guide box 1102 is checked. This made force guides 1104, 1106, 1108 (ellipses) visible, in addition to maximum force guide 920, which in the embodiment is always visible in gesture tab 630. Force guides 1104, 1106, 1108 correspond by color to inner force guide values 1112, 1114, 1116, respectively. That is, force guide 1104 represents force guide value 1112, which is a constant peak force output of 2 k-lbf. Similarly, force guide 1106 represents force guide value 1114, which is a constant peak force output of 8 k-lbf, and force guide 1108 represents force guide value 1116, which is a constant peak force output of 16 k-lbf.

Figure 12:
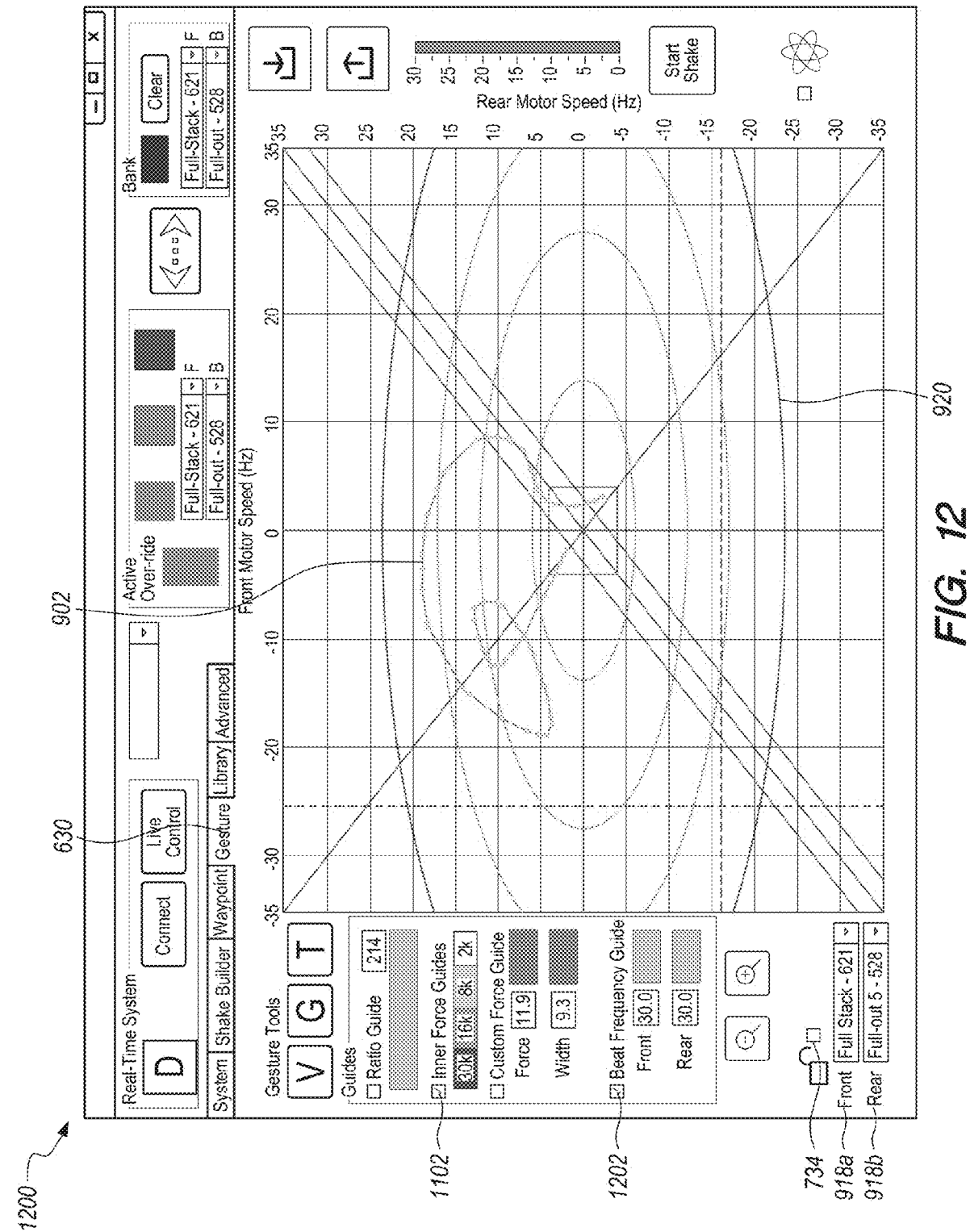

FIG. 12 illustrates a screen shot 1200 of an embodiment of an FFUI. In FIG. 12, inner force guides 1104, 1106, 1108 remain visible. The user has also unlocked synchronization box 734. With synchronization box 734 unchecked, front eccentric setup 918*a* and rear eccentric setup 918*b* may be edited. Front eccentric setup 918*a* has been changed to a much smaller eccentric value than that of FIG. 9. The smaller eccentric value has elongated inner force guides 1104, 1106, 1108 (the ellipses) in the horizontal axis because relatively smaller eccentric values require a higher frequency to reach the same force levels. In FIG. 12, a beat frequency box 1202 is checked making the upward-sloping diagonal beat frequency guide lines visible (shown beginning just to the right of front eccentric setup 918a and rear eccentric setup 918b. With beat frequency guidelines and inner force guides 1102, 1106, 1108 shown, a user may make more informed decisions when plotting the shake. A feature of the embodiment is that tapping a colored bar next to a parameter makes that particular parameter editable by using, e.g., a stylus to indicate the desired change to the parameter by moving the stylus to the desired new position on the frequency/frequency display. For example, a user may enable a pad corresponding to a parameter and, using the stylus, dragging one point to a different location, or tap to create new points, etc., until the disable editing of the parameter by tapping the pad again.

Figure 13:
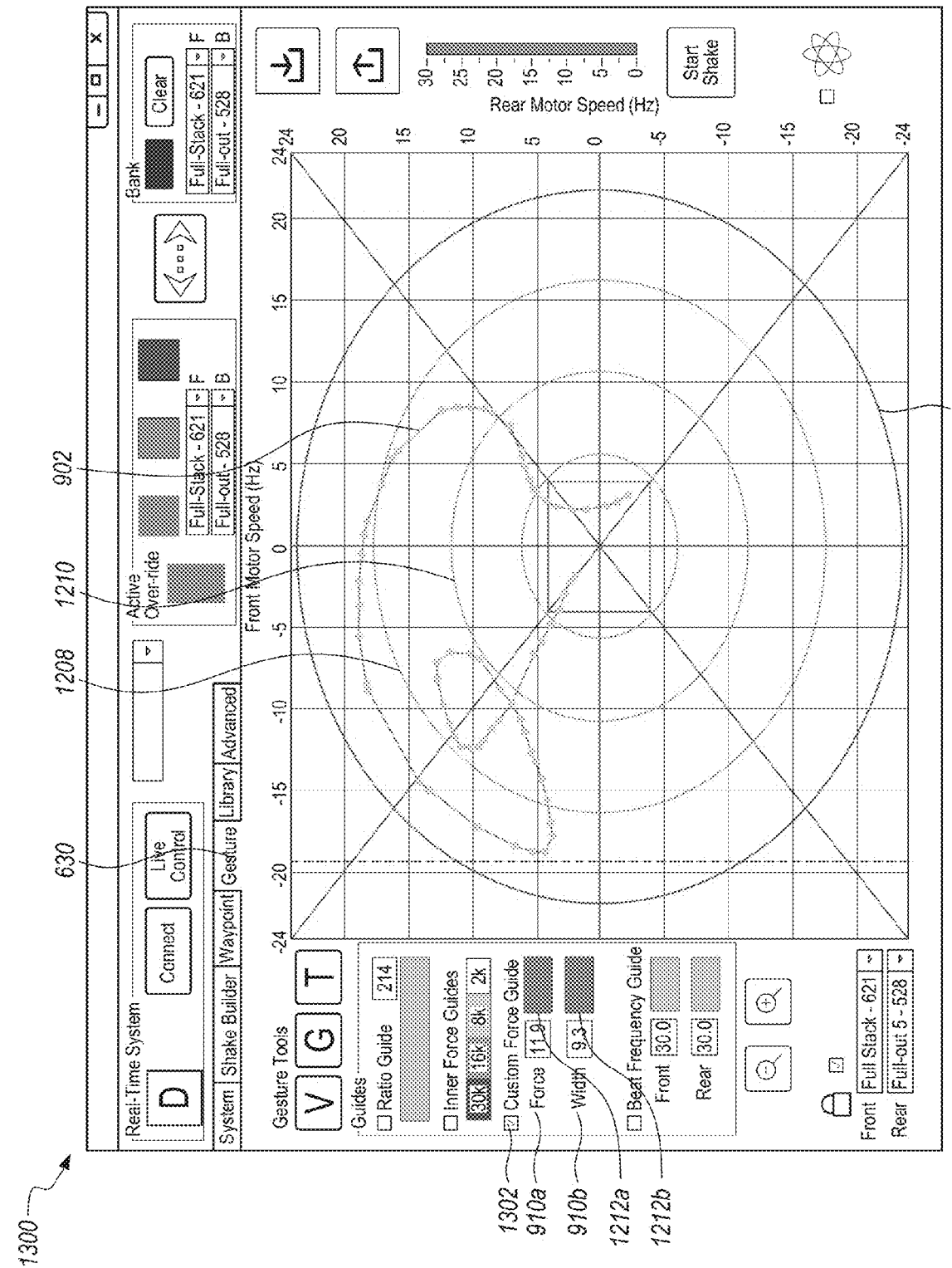

FIG. 13 illustrates a screen shot 1300 of an embodiment of an FFUI. In FIG. 13, a custom force guide box 1202 is checked. This allows the user to set a target force 910a of, e.g., 11.9 k-lbf, and set a force guide width 910b of, e.g., 9.3 k-lbf. In this way, since it is extremely difficult to hit an exact force, the user may dictate the target force 910a desired and then an acceptable tolerance using force width 910b. A maximum force guide 1208 is based on these parameters (force+½ force width). A minimum force guide 1210 is also based on these parameters (force−½ force width). The cyan color pads to the right of the force 910a and width 910b edit boxes can also be clicked to interactively position the guides based on the position of the cursor.

Figure 14:
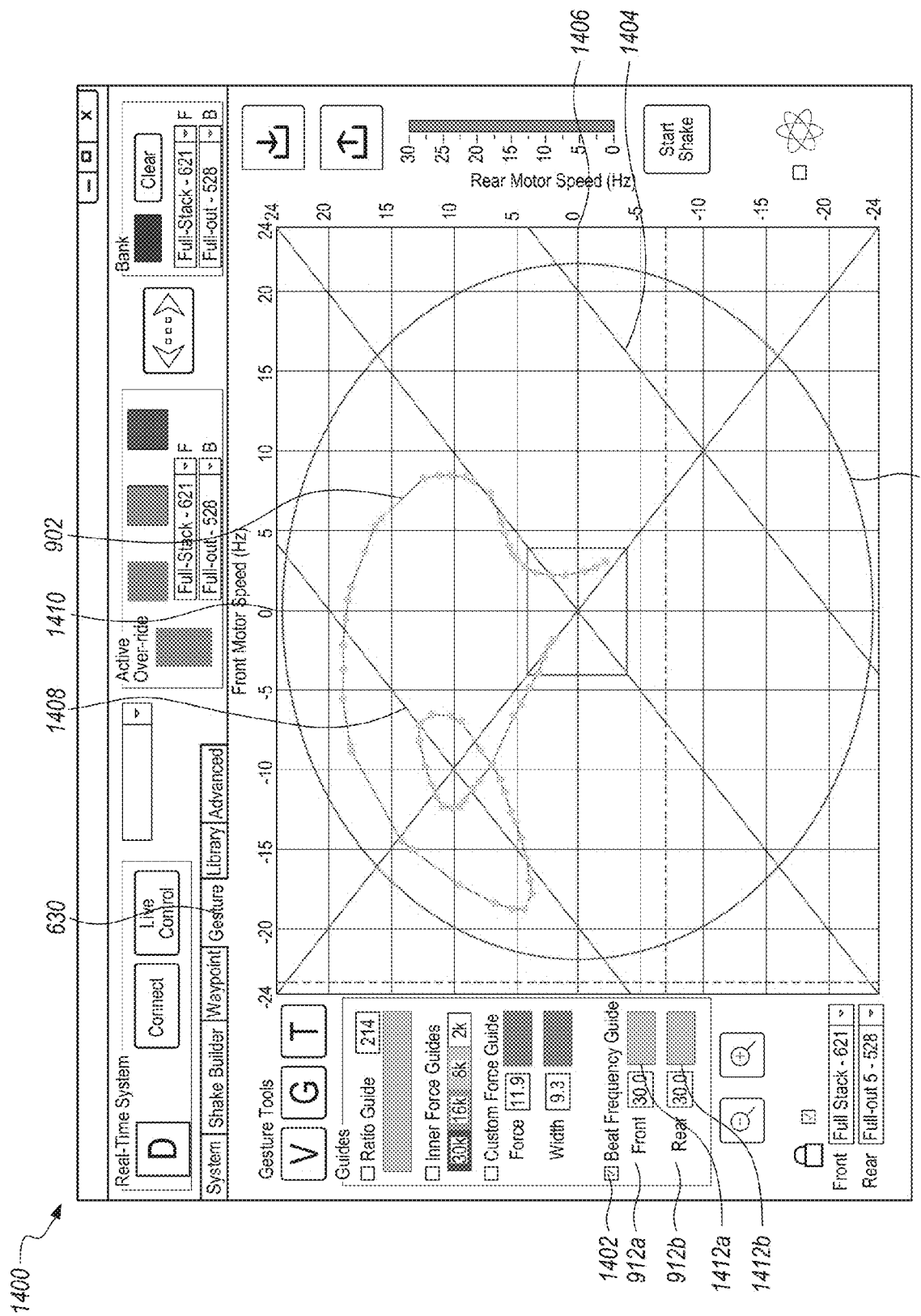

FIG. 14 illustrates a screen shot 1400 of an embodiment of an FFUI. In FIG. 14, a beat frequency guide box 1402 has been checked, making it possible to edit two parameters: front and rear beat frequency guides 912a, 912b. Front beat frequency guide 912a is the intersection (value in Hz) of a front beat frequency guide line 1404 with a front eccentric horizontal axis 1406 (blue line). Rear beat frequency guide 912b is the intersection (value in Hz) of a rear beat frequency guide line 1408 with a rear eccentric vertical axis 1410 (blue line). In screenshot 1400, both are set to 30.0, which means that there is no beat frequency sweep (a "sweep" indicates a change in frequency) in the guide and every position along guides 1404, 1408 has a beat frequency of 30.0 Hz. Clicking on beat frequency guide pads 1412a, 1412b (orange/tan color blocks) gives the user access to interactive placement of each of those parameters using the cursor.

Figure 15:
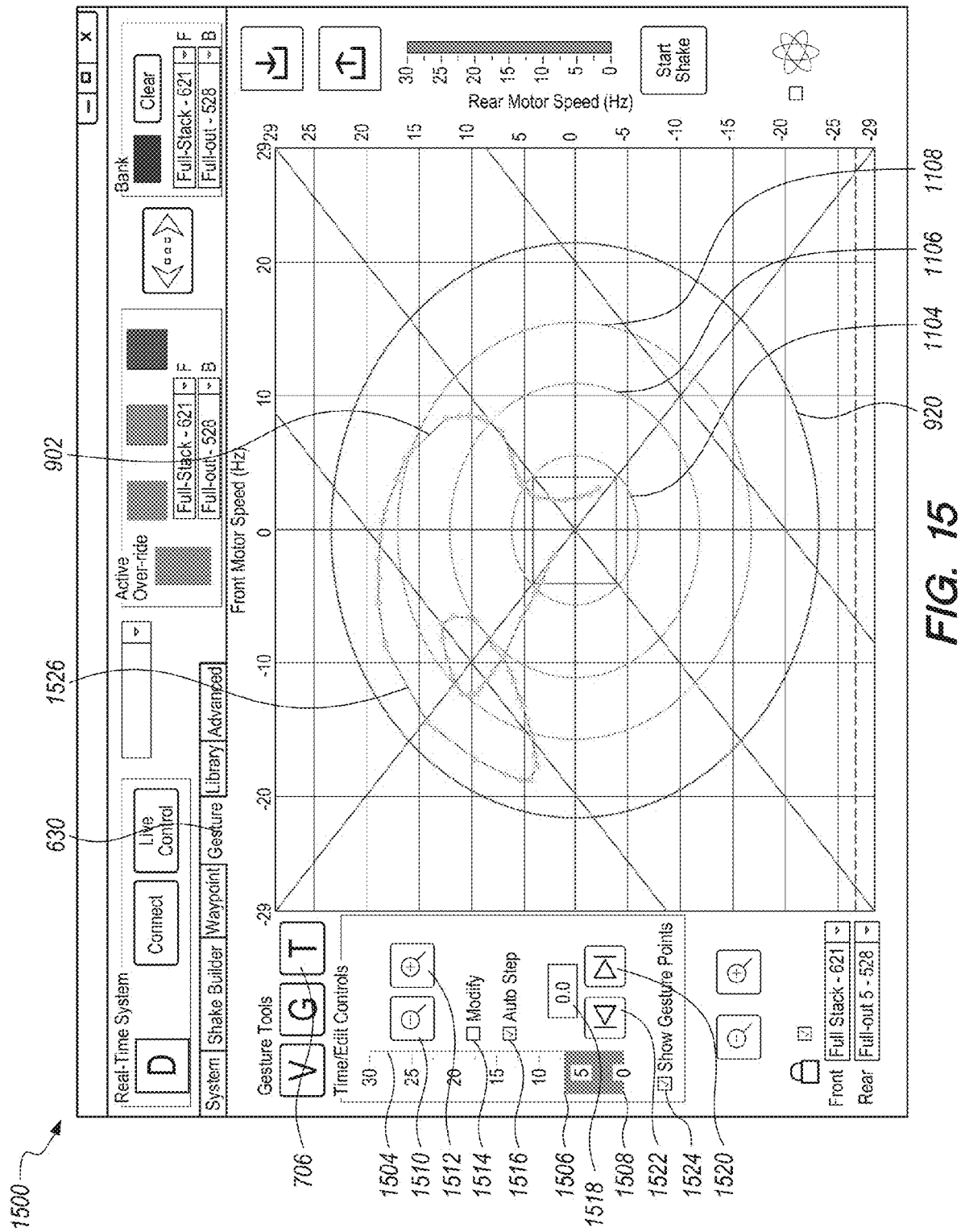

FIG. 15 illustrates a screen shot 1500 of an embodiment of an FFUI. In FIG. 15, T button 706 has been toggled, making time-edit tools available. Time-edit tools provide the use with the ability to edit and navigate in time in addition to frequency. A total available time scale 1504 shows the total available time (30 seconds). In this example, a total time 1506 of a shake profile 1526 is approximately seven seconds (highlighted in green). A current position line 1508 is shown at 00.0 seconds. A time-zoom-in button 1510 allows the user to zoom in on time scale 1504. A time-zoom-out button 1512 allows the user to zoom out on the time bar. A modify check box 1514 allows the user to modify the current time step. An auto-step checkbox 1516 when checked results, when an edit is made to a first time step, in the automatic increment of the time step to the next time step. A current time slice indicator 1518 indicates the time slice that is being edited, in units of seconds. A traverse-time-forward button 1520 moves the time slice forward. A traverse-time-backward button 1522 moves the time slice backward. A show gesture points box 1524, when checked, makes discrete gesture data points visible along FFUI shake profile 1526. Shake profile 1526 is the entire line from the fourth quadrant to the second quadrant. Since gesture data points are currently visible (show gesture points box 1524 is checked) successive dots along shake profile 1526 represent 0.1 second time-steps. The increment of the time-step may be adjusted as desired. Note that if the front and rear motor speeds (F1 and F2) remain constant for more than one time-step, the data points for time-steps that have the same F1 and F2 simply overlay the earlier time steps. Inner force guides 1104, 1106, 1108 remain visible after having been made visible using guide tools previously (e.g., FIG. 12).

Figure 16:
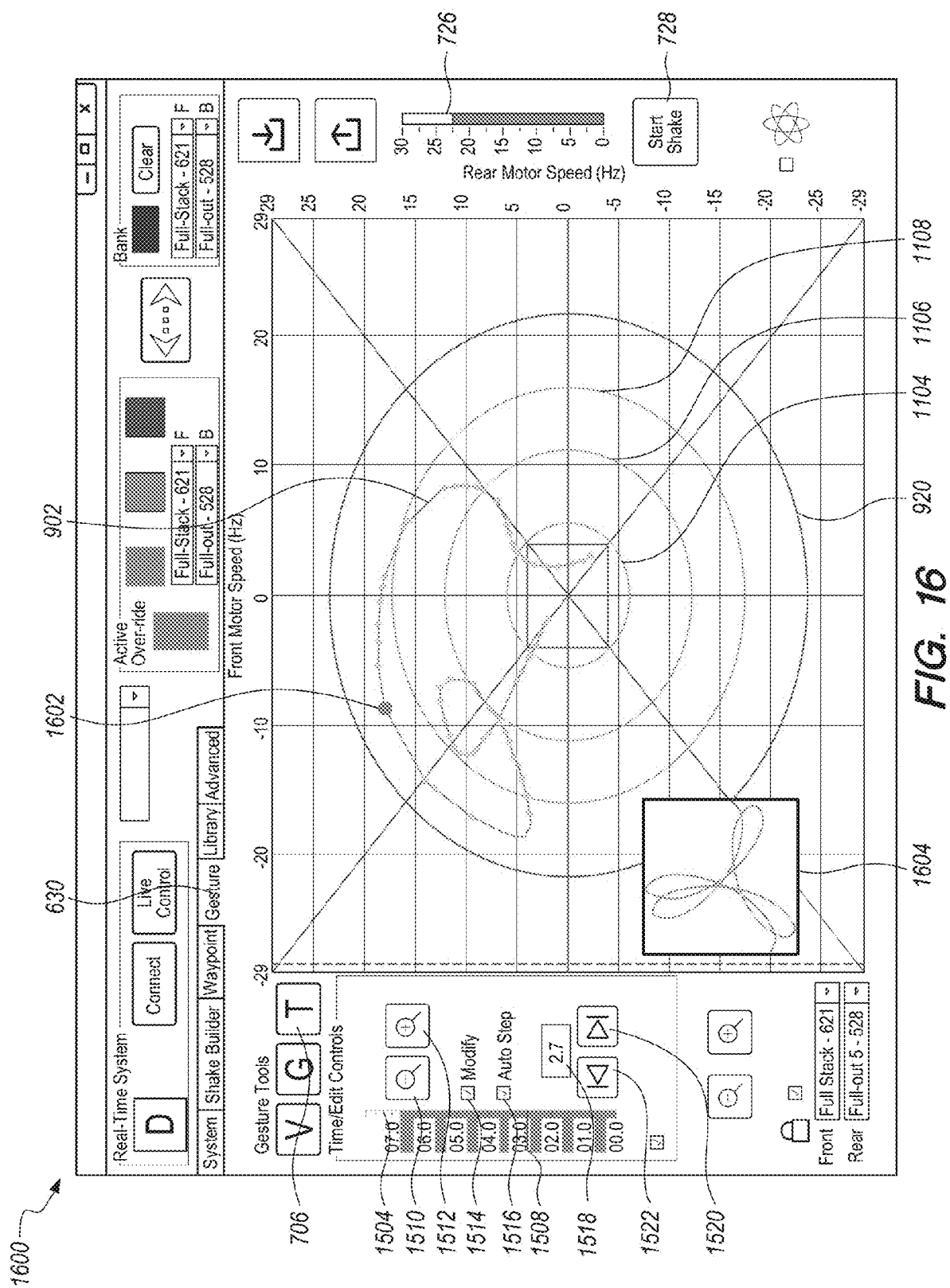

FIG. 16 illustrates a screen shot 1600 of an embodiment of an FFUI. In FIG. 16, the user is using the time-edit toolbar made available by toggling T button 706. The user has selected a modify checkbox 1514, which displays a time-editing cursor 1602 (an orange/red dot highlighting a point on the shake pattern 1526). When in this mode, the FFUI automatically shifts the two feedback mechanisms (force gauge 726 and a pattern 1604 in inset box 906) to display information relevant to the point associated with time-editing cursor 1602. That is, the geometric pattern output is a result of the conditions at the position being edited. Similarly, force gauge 726 displays the force output of that particular point. Total available time scale 1504 has been focused on the first eight seconds of the display shake profile by using a time-zoom-in button 1512. This has manipulated time scale 1504 to display the range from 0 seconds to about 8 seconds. A current position in time along a shake pattern, e.g., shake pattern 1526, can be seen from three different places: first, from time-slice value 1518; second, from frequency/frequency time-editing cursor 1602 (FIG. 16) position in the FFUI Gesture display; and third, from current position line 1508. To move forward in time a user may click time-traverse-forward button 1520. Zoom buttons 1510, 1512 zoom in or out about time-editing cursor 1602. If auto step box 1516 is not checked, the frequency/frequency position of the time point (or "slice") highlighted by time-editing cursor 1602 may be re-positioned any number of times using a stylus to indicate the desired position on the display. In other words, a new tap changes the shake profile characteristics of the time point. If auto step box 1516 is checked, then once a first time point is positioned, time-editing cursor 1602 moves to the next point in time for re-positioning. In other words, a new tap positions the next time slice.

Figure 17:
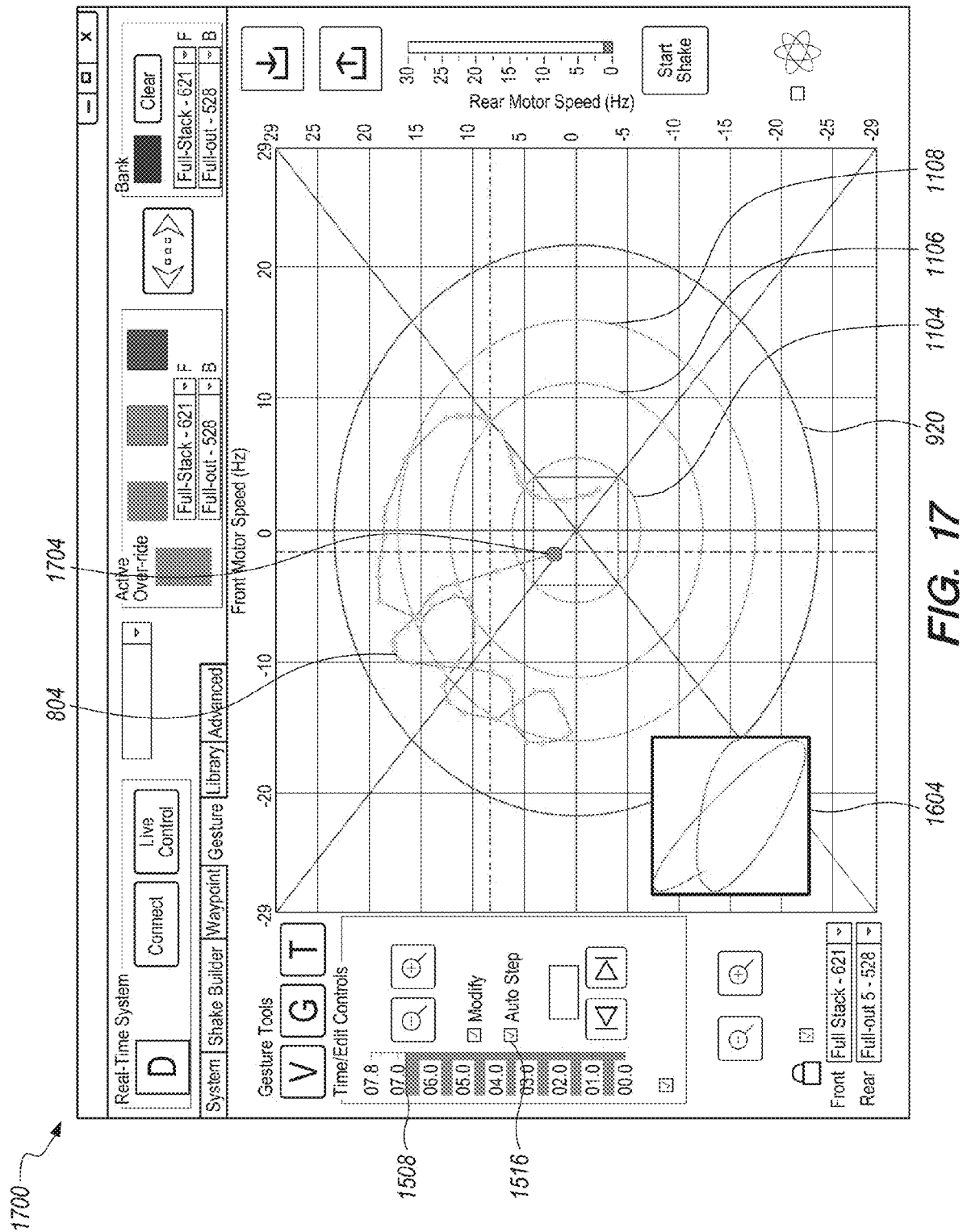

FIG. 17 illustrates a screen shot 1700 of an embodiment of an FFUI. In FIG. 17, screen shot 1700 shows that a user has edited the pattern and advanced forward in time from the time position shown in FIG. 16 creating a different shake profile 804. Since auto step box 1516 was checked, each time the user edited the position of a time-slice in the FFUI frequency-domain editor, the user was automatically moved forward to position the next time-slice. In this way, approximately 35 time points (slices) were edited to arrive at a position 1704 at the end of shake profile 804. This is also shown by the thin red line 1508 in the time plot. The use of auto step shaved a significant amount of time from this process.

Figure 18:
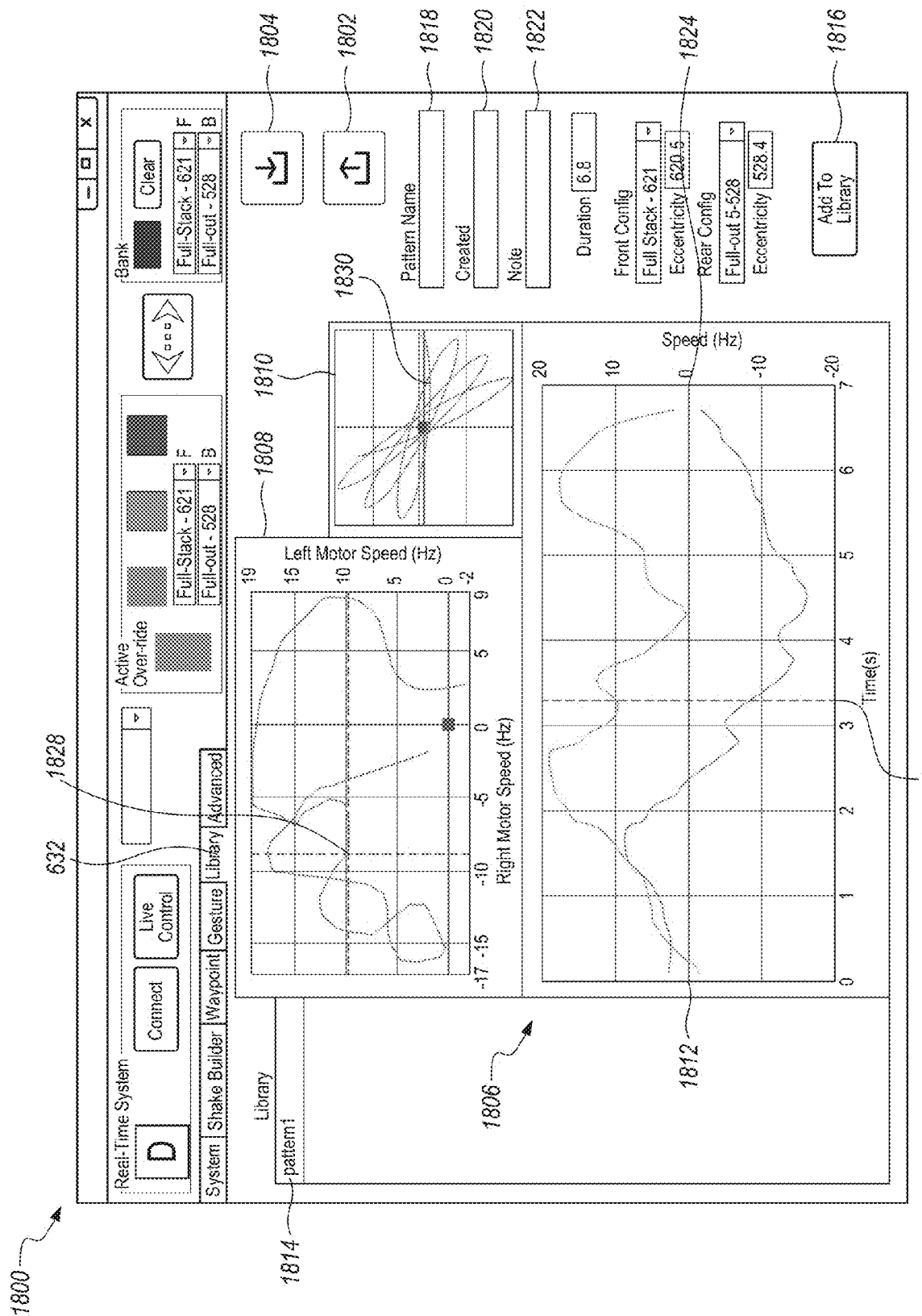

FIG. 18 illustrates a screen shot 1800 of an embodiment of an FFUI. In FIG. 18, screen shot 1800 displays library tab 632. A shake profile (e.g., shake profile 804, FIGS. 8 and 17) may be transferred to library tab 632 by first, while in gesture tab 630, clicking on an upload button 1802, then switching to library tab 634, and then clicking on a download button 1804. Clicking on upload button 1802 transfers a shake profile to the bank. Clicking on download button 1804 transfers a shake profile from the bank to library tab 632 and a library display 1806. Library display 1806 includes: a frequency/frequency representation 1808 of the shake profile that is similar to that in gesture tab 630; a geometric pattern display 1810 that is similar to inset box 1604; and a time domain representation 1812 of the shake. A displayed shake profile may be added to a library 1814 by toggling an add-to-library button 1816. Library display 1806 also displays other characteristics of the shake profile, such as the duration and eccentric configuration. Furthermore, library tab 632 provides the ability to add metadata to a shake profile, such as a pattern name 1818, a date created 1820, and a note 1822. Library tab 632 generally allows a user to view a shake profile from three perspectives: frequency/frequency representation 1808; geometric pattern display 1810; and time domain representation 1812. In time domain representation 1812 the eccentrics are rotating in the same direction when they are both on the same side (above or below) a zero speed line 1824. In time domain representation 1812, a user may also see and understand how fast the speeds change because it interpreting a time-derivative of the shake profile in a time-domain representation is fairly intuitive. In time domain representation 1812, a blue vertical line 1826 selects a time-slice. In frequency/frequency representation 1806, the position in the shake profile of the selected time slice is shown by a blue cross-hair cursor 1828. Because the eccentricity ratio Er is fixed (the eccentricities are set), and for any specific time-slice, there is a fixed Fr, there is a unique geometric shake pattern for the selected time slice. That unique geometric pattern is displayed in geometric pattern display 1810. In library tab 632, a user may view all of the shake profiles in library 1814 and, based on experience, choose shake patterns that are good candidates for saving, tweaking, and re-using.

Figure 19:
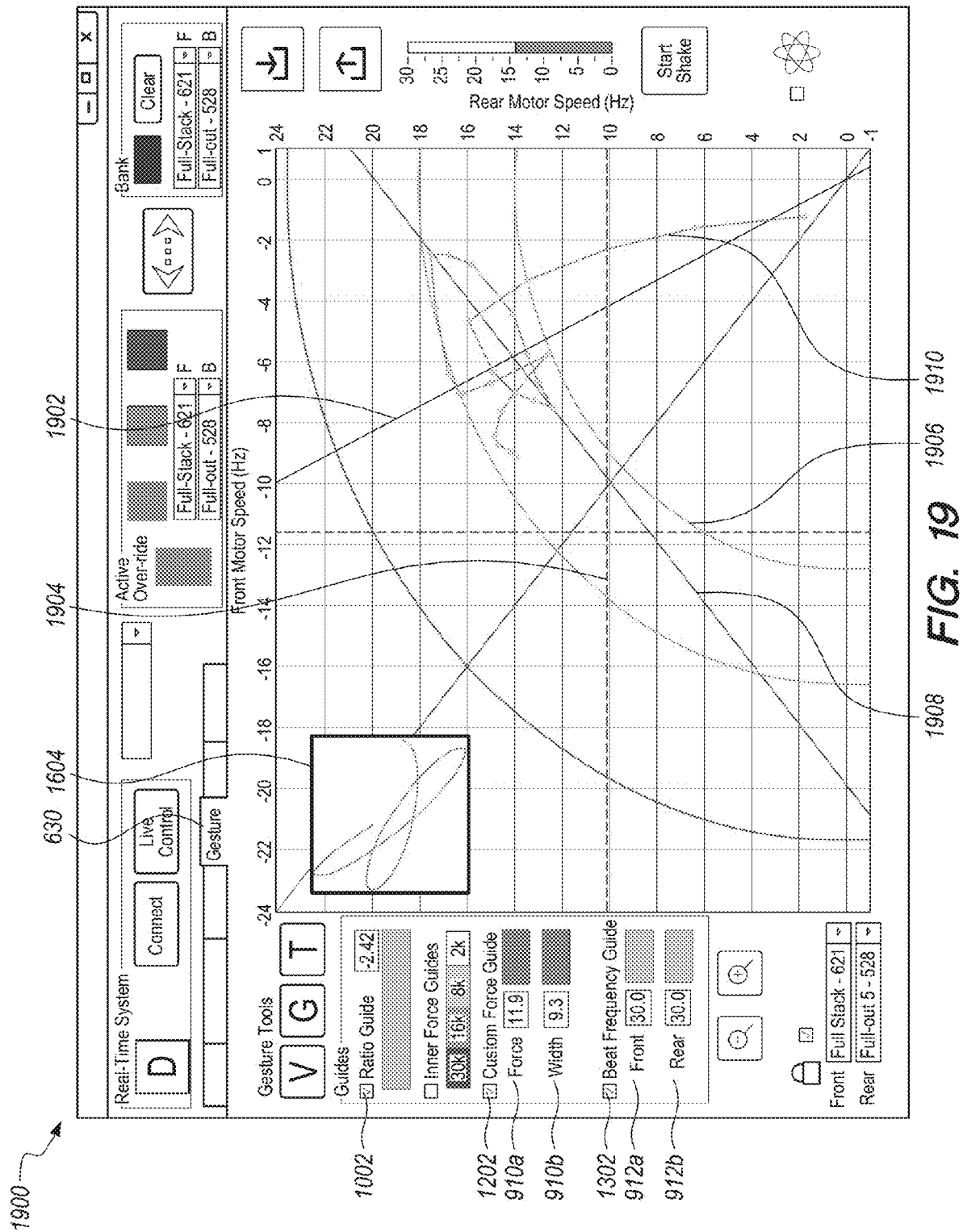

FIG. 19 illustrates a screen shot 1900 of an embodiment of an FFUI showing an example of using multiple guides to help design a shake profile 1910 by constraining or characterizing a design space. In screen shot 1900, gesture tab 630 is displaying the gesture tools. Three different guides are enabled: ratio guide 1002, custom force guide 1302, and beat frequency guide 1202. Ratio guide 1002 is positioned to achieve a particular geometric output (of Fr=−2.42). A ratio line 1902 corresponds to this Fr. Custom force guides 910a, 910b are set to bound a region from 14 k−3.5 k=11.5 k-lbf to 14 k+3.5 k=17.5 k-lbf. This region is bounded by force guide lines 1904, 1906. And front and rear beat frequency guides 912a, 912b guides are set at 20 Hz with the resulting constant beat frequency line 1908 representing a constant 20 Hz beat frequency.

In constraining the design space, the guides as shown in FIG. 19 are suggestions of "lines to color within" or suggestions of lines to remain nearby to. For example, shake profile 1910 could be developed using the guides shown in FIG. 19 as suggestions. Shake profile 1910 would result from trying to remain within custom force guides lines 1904, 1906 and trying to remain near constant beat frequency line 1908.

In a characterization the design space, shake profile 1910 is created first, perhaps during an actual shake of a tree, or testing a tree to see how it responds. If shake profile 1910 was determined to be an efficient use of energy for product removal, the various guides could be positioned about shake profile 1910 to characterize shake profile 1910 for future use in creating other shake profiles.

Each guide constrains the area of the plane in a different way: custom force guide lines 1904, 1906 constrain the profile by suggesting a distance from the origin, but not by suggesting any particular quadrant. Beat frequency guide line 1908 suggests quadrants, but does not suggest any particular distance from the origin. Ratio guide line 1902 constrains the area to a very precise level because, if ratio guide line 1902 and beat frequency guide line 1908 intersect, the intersection provides a target for a shake profile in the FFUI. The intersection indicates a region to explore or gravitate around. It is possible to "over-constrain" the plane and ask for impossible combinations of frequencies, forces and ratios, but by using the guide lines it is relatively easy to visualize the potential combination. Ultimately, the user will never find a "perfect" profile, but these guides make the search more efficient.

Use Cases

Creating a shake profile in real-time (with the control system connected to a harvester with a shaker head allowing independent frequency control (IFC) of the inertial masses (activated, e.g., by rotating eccentric masses or using linear actuators to vibrate inertial masses):

Confirm connection to the IFC-equipped harvester
    Change to "live control" mode
    Clamp shaker head to tree to be harvester
    Press the "start shake" button
    Press a stylus/finger down on the chart area outside of the purple origin box
    Move from outside of the purple origin box to inside of that box
    <shake recording starts, harvester begins shaking>
    Move the stylus/finger as needed to effectively shake the tree (this is where the specifics of situation, e.g., tree, fruit, and ground, need to be considered). Lower beat frequencies will be present in quadrants 1 and 3. Higher beat frequencies will be present in quadrants 2 and 4. Continue to adjust the shaking as the tree dynamically evolves.
    To stop the shaking, lift the stylus/finger from the chart area.

Creating a shake profile in real-time (with the control system disconnected from an IFC-equipped harvester)

Confirm that the "Live Control" mode is not selected
    Press the "start shake" button
    Press a stylus/finger down on the chart area outside of the purple origin box
    Move from outside of the purple origin box to inside of that box
    <shake recording starts>
    Move the stylus/finger as needed to effectively shake the tree (this is where the specifics of the situation need to be considered). Lower beat frequencies will be present in quadrants 1 and 3. Higher beat frequencies will be present in quadrants 2 and 4. Continue to adjust the shaking as the tree dynamically evolves.
    To complete the profile, lift the stylus/finger from the chart area.

Importing an existing pattern to the FFUI from the bank
    Press the download button to pull the existing shake sequence/eccentric configuration from the bank into FFUI.

Exporting a pattern from within the FFUI to the bank
    Press the upload button to push the existing shake sequence/eccentric configuration from the FFUI into the bank.

Editing an existing pattern (Once a pattern exists within the FFUI, it may be edited)

Press the "T" button on the upper left portion of the FFUI tab to see the time-edit tools Click the "Modify" checkbox so that it becomes checked Make sure that the "Show Gesture Points" checkbox is checked.

Use the left/right arrows to navigate to a particular time instant to be edited (an orange circle will show the point that is currently selected for editing, and the box just above the left/right arrows will display the corresponding time instant, in seconds)

If an edit to a sequence of points is intended, check the "Auto-step" checkbox, otherwise leave it checked.

Clicking anywhere on the chart screen will move the current point to that new position. If "Auto Step" is checked the software automatically increments to the next time point. If Auto Step is not chosen, a user may click in different places to re-position that point in the desired place.

To complete the edits, uncheck the "Edit" checkbox.

Shifting the weight set of a specific shake pattern

The eccentric configurations that are associated with a particular pattern may be changed by unchecking the "Lock" in the lower-left corner. Once that is unchecked, the front and real eccentric configurations may be edited using a pull-down menu associated with each box to change to a different eccentric configuration for the pattern being edited.

Re-checking the "Lock" checkbox will cause the system to re-synchronize with the eccentric configuration currently active in the onboard computer (shown in the "Active" area at the top).

Benefits of Independent Frequency Control

Olives are considered one of the hardest tree crops to harvest. An embodiment has achieved in olive harvesting what very few harvesting systems can claim: consistently over 90% removal on average. As described above, the performance of a harvester is dependent on many factors that make it difficult to predict efficiency. Still, it is anticipated that embodiments will be able to remove 50-70% of the product that other harvesting systems leave remaining on the tree. For example, with table olives, typical machinery may remove 65% of the total tree's product. That means that of the 35% of the product that remains, it is estimated that embodiments may remove 50-70% of that remaining product—with the result that only 17.5-10.5% of the product remains on the tree. In other words, embodiments are anticipated to increase overall yield to 82.5-89.5%, which maps very well to the experimental results, which have shown 80-90% removal.

In terms of tree health, embodiments may add years of life for any given tree crop due to the reduction in damage to the tree that may be gained from adjusting the geometry output of the head and from not dwelling in frequency bands that may damage the tree. It is also expected that year-to-year health costs will be reduced significantly because of the reduction in damage to trunks, roots, and branches that are often breach points for incoming diseases. If the trees do not contract various diseases or attract pests, then the costs associated with the chemicals and other disease and pest mitigation efforts can be lowered.

Embodiments may also lower harvesting costs because the same embodiment may be easily adapted to multiple different crops. Embodiments are thus able to be used on multiple crops throughout the year, resulting in a better return on investment that current, non-adaptable equipment.

Furthermore, embodiments may provide growers with increased income each year by removing more product from their trees. The increase in removal will also allow growers to spend less money and time removing product that lingers—an operation performed to mitigate pest problems. If enough product is removed by an embodiment, operations directed to mitigating pest problems (e.g., mummy shaking) may be entirely eliminated.

Benefits of a Frequency/Frequency User Interface

In an embodiment of a frequency/frequency user interface, force is proportional to the square of the distance from the origin, and lines of constant force take the form of ellipses centered about the origin. Such ellipses may be used to hit force output targets (see, e.g., inner force guide lines 1104, 1106, 1108 (FIG. 11) and custom force guide lines 1208, 1210 (FIG. 13).

Keeping one of frequencies F1 or F2 constant by having a shake profile follow a horizontal or vertical line on a frequency/frequency display (see, e.g., chart area 710 (FIG. 7)) sweeps the range of the other frequency, and simultaneously sweeps a range of the beat frequency.

Constant frequency ratio ($F_r$) lines are straight lines that travel through the origin (see, e.g., ratio guide line 908 (FIG. 10)). With fixed eccentrics, and thus a fixed eccentricity ratio ($E_r$), those constant frequency ratio lines are also lines of constant geometry lines (constant $E_r$ and constant $F_r$).

Constant beat frequency lines (see, e.g., beat frequencies 1404, 1408 (FIG. 14)) are straight lines that do not go through the origin (C=$F_1$-$F_2$, where C (i.e., a beat frequency "$F_b$") is not zero) and that are parallel to the (frequency ratio) $F_r$=1 line. Such lines form a set of parallel lines that do not go through the origin.

Slew rate (or "acceleration") limiters can be applied to help the user understand how fast (or slow) the system can respond to their request. For example, because of the rotational inertia of the eccentrics, a system probably does not have enough power to move from 10 RPM to 1000 RPM in 10 milliseconds. Slew rate limitations may be enforced by limiting the distance between each "dot" or data point in the plot area, which in turn would be a limitation on how the FFUI responds to a user stylus or hand movement.

A Computing System for a Frequency/Frequency User Interface

Figure 20:
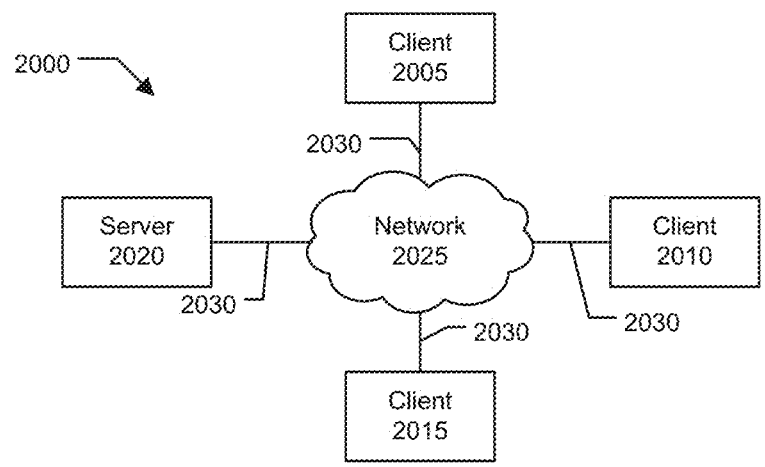
FIG. 20 is a simplified block diagram of a distributed computer network of an embodiment of a system for independent frequency control of a shaker head.

FIG. 20 is a simplified block diagram of a distributed computer network 2000 of an embodiment of independent frequency control of a shaker head. Computer network 2000 includes a number of client systems 2005, 2010, and 2015, and a server system 2020 coupled to a communication network 2025 via a plurality of communication links 2030. Communication network 2025 provides a mechanism for allowing the various components of distributed network 2000 to communicate and exchange information with each other. In an embodiment, the onboard computing system of FIGS. 11 and 12 may be one of client systems 2005, 2010, and 2015 and may be used to control embodiments of IFC, or a typical shaker head, using an embodiment of an FFUI. In an embodiment, the onboard computing system of FIGS. 11 and 12 may itself be controlled by another of client systems 2005, 2010, and 2015 using an embodiment of an FFUI.

Communication network 2025 may itself be comprised of many interconnected computer systems and communication links. Communication links 2030 may be hardwire links, optical links, satellite or other wireless communications links, wave propagation links, or any other mechanisms for communication of information. Various communication protocols may be used to facilitate communication between the various systems shown in FIG. 20. These communication protocols may include TCP/IP, HTTP protocols, wireless application protocol (WAP), vendor-specific protocols, customized protocols, and others. While in one embodiment, communication network 2025 is the Internet, in other embodiments, communication network 2025 may be any suitable communication network including a local area network (LAN), a wide area network (WAN), a wireless network, a intranet, a private network, a public network, a switched network, and combinations of these, and the like.

Distributed computer network 2000 in FIG. 20 is merely illustrative of an embodiment and does not limit the scope of the claims. One of ordinary skill in the art would recognize other variations, modifications, and alternatives. For example, more than one server system 2020 may be connected to communication network 2025. As another example, a number of client systems 2005, 2010, and 2015 may be coupled to communication network 2025 via an access provider (not shown) or via some other server system.

Client systems 2005, 2010, and 2015 typically request information from a server system which provides the information. Server systems by definition typically have more computing and storage capacity than client systems. However, a particular computer system may act as both a client or a server depending on whether the computer system is requesting or providing information. Aspects of the embodiments may use a client-server environment or a cloud-cloud computing environment.

Server 2020 is responsible for receiving information requests from client systems 2005, 2010, and 2015, performing processing required to satisfy the requests, and for forwarding the results corresponding to the requests back to the requesting client system. The processing required to satisfy the request may be performed by server system 2020 or may alternatively be delegated to other servers connected to communication network 2025.

Client systems 2005, 2010, and 2015 enable users to access and query information or applications stored by server system 2020. Some example client systems include portable electronic devices (e.g., mobile communication devices) such as the Apple iPhone®, the Apple iPad®, the Palm Pre™, or any device running the Apple iOS™, Android™ OS, Google Chrome OS, Symbian OS®, Windows Mobile® OS, Palm OS® or Palm Web OS™. In a specific embodiment, a "web browser" application executing on a client system enables users to select, access, retrieve, or query information and/or applications stored by server system 2020. Examples of web browsers include the Android browser provided by Google, the Safari® browser provided by Apple, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others.

Figure 21:
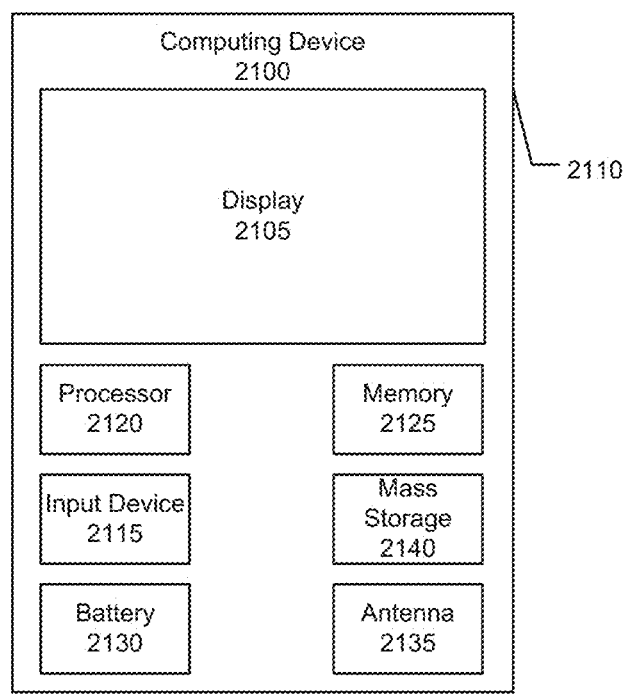
FIG. 21 illustrates an exemplary computing device of an embodiment of a system for independent frequency control of a shaker head.

FIG. 21 shows an exemplary computing device 2100, of an embodiment of a system for independent frequency control of a shaker head, which may serve as any of client systems 2005, 2010, 2015. In an embodiment of an FFUI, a user may use an FFUI to interface with the IFC system, or a typical shaker head, through a client computing device 2100, such as shown in FIG. 21. Computing device 2100 (which may be, e.g., a personal computer, a mobile client communication device, or a portable electronic device) includes a display, screen, or monitor 2105, housing 2110, and input device 2115. Housing 2110 houses familiar computer components, some of which are not shown, such as a processor 2120, memory 2125, battery 2130, speaker, transceiver, antenna 2135, microphone, ports, jacks, connectors, camera, input/output (I/O) controller, display adapter, network interface, mass storage devices 2140, and the like.

Input device 2115 may also include a touchscreen (e.g., resistive, surface acoustic wave, capacitive sensing, infrared, optical imaging, dispersive signal, or acoustic pulse recognition), keyboard (e.g., electronic keyboard or physical keyboard), body movement tracking devices, holographic input devices, buttons, switches, stylus, appendages (fingers), or combinations of these.

Mass storage devices 2140 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

Embodiments may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 21 is but an example of a computer system suitable for use with the present embodiments. Other configurations of subsystems suitable for use with the present embodiments will be readily apparent to one of ordinary skill in the art. For example, in a specific embodiment, the computing device is mobile communication device such as a smartphone or tablet computer. Some specific examples of smartphones include the Droid Incredible and Google Nexus One, provided by HTC Corporation, the iPhone or iPad, both provided by Apple, and many others. The computing device may be a laptop or a netbook. In another specific embodiment, the computing device is a non-portable computing device such as a desktop computer or workstation.

A computer-implemented or computer-executable version of the program instructions useful to practice embodiments may be stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice embodiments may be stored or reside in RAM or cache memory, or on mass storage device 2140. The source code of this software may also be stored or reside on mass storage device 2140 (e.g., flash drive, hard disk, magnetic disk, tape, or CD-ROM). As a further example, code useful for practicing embodiments may be transmitted via wires, radio waves, or through a network such as the Internet. In another specific embodiment, a computer program product is provided that includes a variety of software program code to implement the features.

Computer software products may be written in any of various suitable programming languages, such as Visual Basic, Lua, C, C++, C#, Pascal, Fortran, Perl, MATLAB® (from MathWorks, www.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, bada, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows CE, Windows Mobile, Windows Phone 7), Linux, HP-UX, UNIX, Sun OS, Solaris, Mac OS X, Alpha OS, AIX, IRIX32, IRIX64, or QNX. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing embodiments using a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

It should be understood that the arrangements of the hardware devices illustrated above are but a few of the possible embodiments and that other arrangements are possible. It should also be understood that the various system components (and means) defined by the claims, described above, and illustrated in the various diagrams represent components that are configured to perform the functionality described herein. For example, one or more of these system components (and means) can be realized, in whole or in part, by at least some of the components illustrated in the arrangement of computing device 2100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIGS. 20 and 21. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description, the subject matter may be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of the disclosure. These steps are merely exemplary and are not meant to be limiting in any way. Other steps and functions may be contemplated without departing from this disclosure.

What is claimed is:

1. A method for controlling a shaker having a first shaking frequency and a second shaking frequency using a user interface on a touchscreen of a computing device, the method comprising:

(i) providing, by the user interface on the touchscreen, a display region having a plurality of locations, each location in the display region corresponding to:
  a. a first frequency of a first frequency axis, the first frequency representing a first shaking frequency of a first mass of the shaker, and
  b. a second frequency of a second frequency axis, the second frequency representing a second shaking frequency of a second mass of the shaker;
(ii) detecting, by the user interface, a contact with the touchscreen at a point of contact;
(iii) while detecting, by the user interface, the contact:
  a. initiating, by the user interface in response to the contact, a shake of the shaker;
  b. detecting, by the user interface, the point of contact at one or more locations among the plurality of locations within the display region
  c. in response to detecting the point of contact at a location:
    i. setting, by the user interface, the first shaking frequency of the first mass according to the first frequency corresponding to the contacted location; and
    ii. setting, by the user interface, the second shaking frequency of the second mass according to the second frequency corresponding to the contacted location; and
(iv) detecting, by the user interface, no contact with the touchscreen;
(v) in response to detecting no contact, ending, by the user interface, the shake.

2. The method of claim 1, wherein the initiating the shake of the shaker is in response to detecting, by the user interface, the point of contact moving from a first contacted location outside of a first zone of the display region to a second contacted location within the first zone.

3. The method of claim 1, wherein:
(i) the first frequency represents a first shaking frequency of a first eccentric mass of the shaker, the first shaking frequency resulting from a rotation of the first eccentric mass; and
(ii) each location in the display region further corresponds to a first direction of rotation of a first rotation axis, the first rotation axis being parallel to the first frequency axis, the first direction of rotation representing:
  a. a clockwise rotation of the first eccentric mass,
  b. a counter-clockwise rotation of the first eccentric mass, or
  c. no rotation of the first eccentric mass.

4. The method of claim 1 further comprising:
(i) for a subset of the at least one contacted location, associating, by the user interface, a time of contact with the contacted location; and
(ii) saving, by the user interface, the shake by storing the subset of the at least one contacted location with the associated time.

5. The method of claim 1 further comprising:
indicating, by the user interface on the display region, a path of the point of contact moving to at least one location within the display region, the path including a subset of the at least one contacted location.

6. The method of claim 1 further comprising:
(i) providing, by the user interface on the display region, a ratio guide line representing a ratio of the first shaking frequency to the second shaking frequency;
(ii) providing, by the user interface on the display region, an upper force guide representing an upper force exerted by the first and second masses; and
(iii) providing, by the user interface on the display region, a lower force guide representing a lower force exerted by the first and second masses, wherein the upper and lower force guide lines bound a force region of the display region.

7. The method of claim 6 further comprising:
providing, by the user interface on the display region, a beat frequency guide line associated with a difference between the first shaking frequency and the second shaking frequency.

8. A method for controlling a shaker having a first shaking frequency and a second shaking frequency using a user interface on a touchscreen of a computing device, the method comprising:
(i) providing, by the user interface on the touchscreen, a display region having a plurality of locations, each location in the display region corresponding to:
  a. a first frequency of a first frequency axis, the first frequency representing a first shaking frequency of a first mass of the shaker, and
  b. a second frequency of a second frequency axis, the second frequency representing a second shaking frequency of a second mass of the shaker;
(ii) detecting, by the user interface, a contact with the touchscreen at a point of contact;
(iii) while detecting the contact:
  a. detecting, by the user interface, the point of contact at one or more locations among the plurality of locations within the display region; and
  b. for a subset of the one or more contacted locations, associating, by the user interface, a time of contact with each contacted location; and
(iv) saving, by the user interface, the shake by storing the subset of the one or more contacted locations with the associated times.

9. The method of claim 8 further comprising:
(i) receiving, by the user interface, a command to initiate the shake of the shaker; and
(ii) in response to the command, setting, by the user interface, the first shaking frequency and the second shaking frequency according to the subset of the one or more contacted locations and the associated times, including for each of the subset of contacted locations and associated times:
  a. setting the first shaking frequency of the first mass according to the first frequency corresponding to the contacted location and the associated time; and
  b. setting the second shaking frequency of the second mass according to the second frequency corresponding to the contacted location and the associated time.

10. The method of claim 9 further comprising:
(i) receiving, by the user interface from the shaker after the initiation of the shake, data of the first shaking frequency and the second shaking frequency: and
(ii) indicating, by the user interface on the display region, the first shaking frequency and the second shaking frequency.

11. The method of claim 8, wherein:
(i) the first frequency represents a first shaking frequency of a first eccentric mass of the shaker, the first shaking frequency resulting from a rotation of the first eccentric mass; and
(ii) each location in the display region further corresponds to a first direction of rotation of a first rotation axis, the first rotation axis being parallel to the first frequency axis, the first direction of rotation representing:
c. a clockwise rotation of the first eccentric mass,
d. a counter-clockwise rotation of the first eccentric mass, or
e. no rotation of the first eccentric mass.

12. The method of claim 8 further comprising:
(i) providing, by the user interface on the display region, a ratio guide line representing a ratio of the first shaking frequency to the second shaking frequency;
(ii) providing, by the user interface on the display region, an upper force guide representing an upper force exerted by the first and second masses; and
(iii) providing, by the user interface on the display region, a lower force guide representing a lower force exerted by the first and second masses, wherein the upper and lower force guide lines bound a force region of the display region.

13. The method of claim 12 further comprising:
providing, by the user interface on the display region, a beat frequency guide line associated with a difference between the first shaking frequency and the second shaking frequency.

14. A non-printed, computer-readable media comprising instructions, which when executed by a processor of a computing device with an associated touchscreen, perform the steps of a method for controlling a shaker having a first shaking frequency and a second shaking frequency using a user interface on a touchscreen of a computing device, the method comprising:
(i) providing, by the user interface on the touchscreen, a display region having a plurality of locations, each location in the display region corresponding to:
a. a first frequency of a first frequency axis, the first frequency representing a first shaking frequency of a first mass of the shaker, and
b. a second frequency of a second frequency axis, the second frequency representing a second shaking frequency of a second mass of the shaker;
(ii) detecting, by the user interface, a contact with the touchscreen at a point of contact;
(iii) while detecting, by the user interface, the contact:
a. initiating, by the user interface in response to the contact, a shake of the shaker;
b. detecting, by the user interface, the point of contact at one or more locations among the plurality of locations within the display region;
c. in response to detecting the point of contact at a location:
i. setting, by the user interface, the first shaking frequency of the first mass according to the first frequency corresponding to the contacted location; and
ii. setting, by the user interface, the second shaking frequency of the second mass according to the second frequency corresponding to the contacted location; and (iv) detecting, by the user interface, no contact with the touchscreen;
(v) in response to detecting no contact, ending, by the user interface, the shake.

15. The non-printed, computer-readable media of claim 14, wherein the initiating the shake of the shaker is in response to detecting, by the user interface, the point of contact moving from a first contacted location outside of a first zone of the display region to a second contacted location within the first zone.

16. The non-printed, computer-readable media of claim 14, wherein:
(i) the first frequency represents a first shaking frequency of a first eccentric mass of the shaker, the first shaking frequency resulting from a rotation of the first eccentric mass; and
(ii) each location in the display region further corresponds to a first direction of rotation of a first rotation axis, the first rotation axis being parallel to the first frequency axis, the first direction of rotation representing:
a. a clockwise rotation of the first eccentric mass,
b. a counter-clockwise rotation of the first eccentric mass, or
c. no rotation of the first eccentric mass.

17. The non-printed, computer-readable media of claim 14, the method further comprising:
(i) for a subset of the at least one contacted location, associating, by the user interface, a time of contact with the contacted location; and
(ii) saving, by the user interface, the shake by storing the subset of the at least one contacted location with the associated time.

18. The non-printed, computer-readable media of claim 14, the method further comprising:
indicating, by the user interface on the display region, a path of the point of contact moving to at least one location within the display region, the path including a subset of the at least one contacted location.

19. The non-printed, computer-readable media of claim 14, the method further comprising:
(i) providing, by the user interface on the display region, a ratio guide line representing a ratio of the first shaking frequency to the second shaking frequency;
(ii) providing, by the user interface on the display region, an upper force guide representing an upper force exerted by the first and second masses; and
(iii) providing, by the user interface on the display region, a lower force guide representing a lower force exerted by the first and second masses, wherein the upper and lower force guide lines bound a force region of the display region.

20. The non-printed, computer-readable media of claim 19, the method further comprising:
providing, by the user interface on the display region, a beat frequency guide line associated with a difference between the first shaking frequency and the second shaking frequency.

* * * * *